(12) United States Patent
Kawanishi

(10) Patent No.: US 11,716,429 B2
(45) Date of Patent: Aug. 1, 2023

(54) IMAGE FORMING APPARATUS, METHOD OF CONTROLLING IMAGE FORMING APPARATUS, AND STORAGE MEDIUM

(71) Applicant: CANON KABUSHIKI KAISHA, Tokyo (JP)

(72) Inventor: Masaki Kawanishi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/544,155

(22) Filed: Dec. 7, 2021

(65) Prior Publication Data

US 2022/0247881 A1 Aug. 4, 2022

(30) Foreign Application Priority Data

Feb. 1, 2021 (JP) .................................. 2021-014451

(51) Int. Cl.
*H04N 1/00* (2006.01)
*G06F 3/04847* (2022.01)

(52) U.S. Cl.
CPC ..... *H04N 1/00503* (2013.01); *G06F 3/04847* (2013.01); *H04N 2201/0094* (2013.01)

(58) Field of Classification Search
CPC ........ H04N 1/00503; H04N 2201/0094; G06F 3/04847
USPC ....................................................... 358/1.15
See application file for complete search history.

(56) References Cited

U.S. PATENT DOCUMENTS

| 10,375,259 B2 | 8/2019 | Yamamoto | |
| 2007/0046988 A1* | 3/2007 | Kasatani | H04N 1/32053 |
| | | | 358/1.15 |
| 2008/0007766 A1* | 1/2008 | Sasakuma | H04N 1/00501 |
| | | | 358/1.15 |
| 2010/0202016 A1* | 8/2010 | Matsuzawa | H04N 1/00233 |
| | | | 358/1.15 |
| 2017/0272586 A1* | 9/2017 | Takeuchi | H04N 1/344 |
| 2018/0227446 A1* | 8/2018 | Yamamoto | H04N 1/00095 |

FOREIGN PATENT DOCUMENTS

JP 2018129676 A 8/2018

* cited by examiner

*Primary Examiner* — Neil R McLean
(74) *Attorney, Agent, or Firm* — Rossi, Kimms & McDowell LLP

(57) ABSTRACT

According to the present disclosure, there is provided an image forming apparatus including an operation device, one or more memories, and one or more processors that execute instructions to receive an instruction for registering a document in the one or more memories, register the document according to the instruction in the one or more memories, and control the operation device such that a function selection screen including a button for instructing execution of printing of the registered document is displayed, in which if the instruction received by a reception unit includes information indicating a printing valid period of the document according to the instruction, a button for instructing execution of printing of the document according to the instruction is displayed as being valid on the function selection screen in the printing valid period.

6 Claims, 23 Drawing Sheets

FIG. 9

Fixed form document printing — 901

Registration of new button

[ OK ]—940  [ Cancel ]—941

Basic setting

Button name: [ Form1 ]—902 (Up to 20 letters)

Path of file: [ C:tmp¥AAA.pdf ]—903  [ Reference... ]—904

Type of fixed form document:
● Personal document —905
○ Shared document

Printable period:

Date and time of starting (YYYY MM/DD hh:mm): [2020]/[11]/[02] [08]:[30]—906

Date and time of ending (YYYY MM/DD hh:mm): [2020]/[11]/[20] [17]:[00]—907

☐ Automatically delete fixed form document after date and time of ending —908

Printing setting

Double-sided:
● Double-sided —920
○ Single-sided

Color mode:
○ Automatic (color/monochrome) —921
● Color
○ Monochrome —922

Number of copies: [ 3 ] (1~9999)

FIG. 10A

Bibliographic information list 1001

| 1002 Date and time of registration | 1003 User name | 1004 Storage location | 1005 Printing job name | 1006 Printing setting | 1007 Printing Job type | 1008 Date and time of starting | 1009 Date and time of ending | 1010 Deletion at ending | 1011 Button name | 1012 Type of fixed form document | |
|---|---|---|---|---|---|---|---|---|---|---|---|
| 2020/10/26 10:34:45 | User1 | /data/User1/doc1 | AAA.pdf | Double-sided 1 copy Monochrome | Fixed form document | 2020/11/2 8:30 | 2020/11/20 17:00 | YES | Form1 | Personal | ~1021 |
| 2020/10/26 13:50:22 | User1 | /data/User1/doc2 | BBB.pdf | Single-sided 1 copy Color | Fixed form document | 2020/11/9 12:00 | 2020/11/16 17:00 | NO | Form2 | Shared | ~1022 |

FIG. 10B

Bibliographic information list 1001

| 1002 Date and time of registration | 1003 User name | 1004 Storage location | 1005 Printing job name | 1006 Printing setting | 1007 Printing Job type | 1008 Date and time of starting | 1009 Date and time of ending | 1010 Deletion at ending | 1011 Button name | 1012 Type of fixed form document | |
|---|---|---|---|---|---|---|---|---|---|---|---|
| 2020/10/26 10:34:45 | User1 | /data/User1/doc1 | AAA.pdf | Double-sided 1 copy Monochrome | Fixed form document | 2020/11/2 8:30 | 2020/11/20 17:00 | YES | Form1 | Personal | ~1021 |
| 2020/10/26 13:50:22 | User1 | /data/User1/doc2 | BBB.pdf | Single-sided 1 copy Color | Fixed form document | 2020/11/9 12:00 | 2020/11/16 17:00 | NO | Form2 | Shared | ~1022 |
| 2020/11/10 14:10:00 | User1 | /data/User1/doc3 | CCC.doc | Double-sided 5 copies Color | Normal | | | | | | ~1023 |
| 2020/11/10 14:12:00 | User1 | /data/User1/doc4 | DDD.doc | Single-sided 3 copies Color | Normal | | | | | | ~1024 |
| 2020/11/10 14:13:00 | User1 | /data/User1/doc5 | EEE.doc | Single-sided 2 Copies Monochrome | Normal | | | | | | ~1025 |
| 2020/11/10 14:14:00 | User1 | /data/User1/doc6 | FFF.doc | Single-sided 2 Copies Color | Reserved | | | | | | ~1026 |
| 2020/11/10 14:15:00 | User2 | /data/User2/doc1 | GGG.doc | Single-sided 3 copies Color | Normal | | | | | | ~1027 |

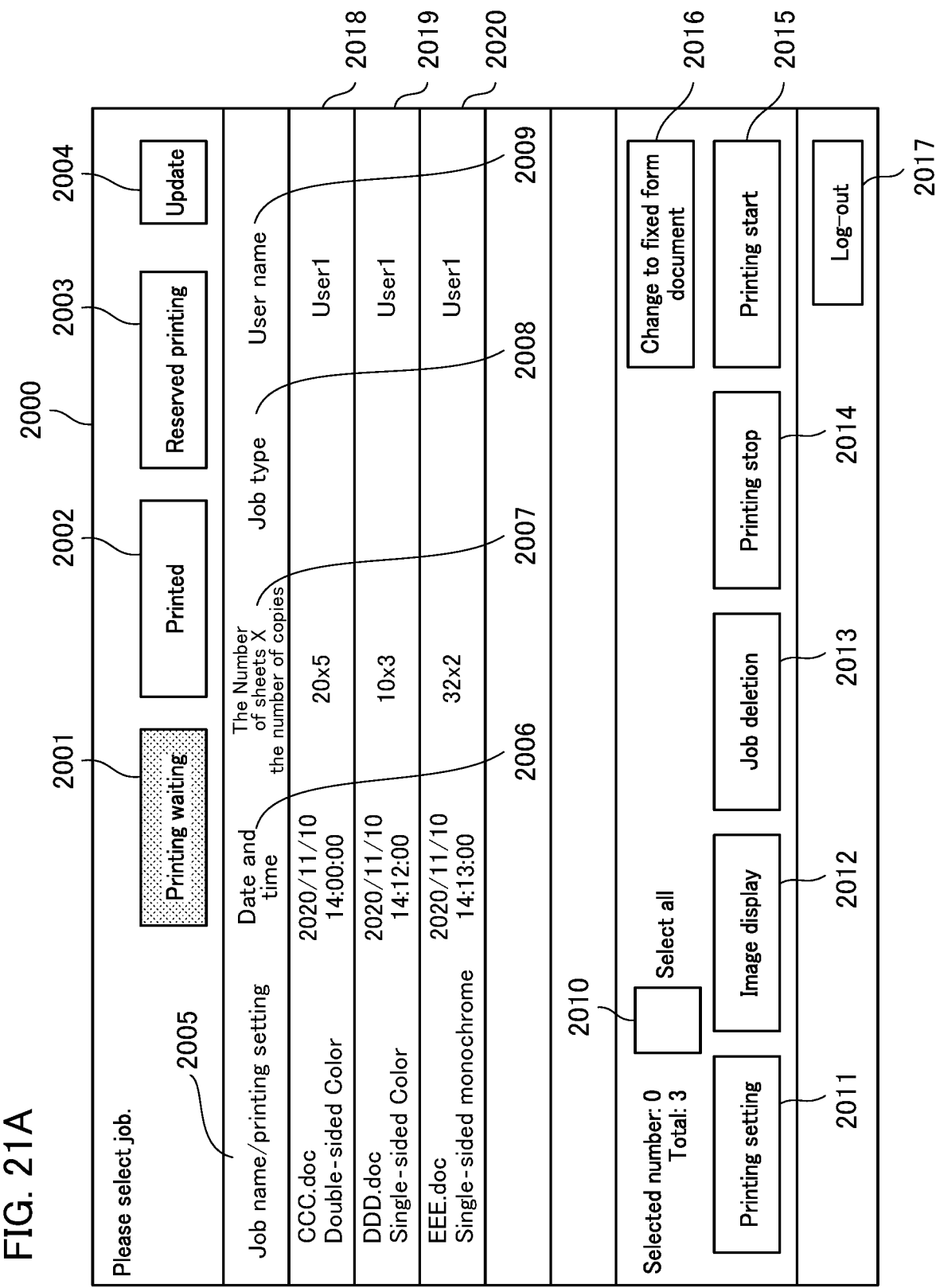

FIG. 21B

Please select job.

Registration setting of shared document — 1620

Type of fixed form document: ● Personal document — 1621
○ Shared document

Printable period:

Date and time of starting (YYYY MM/DD hh:mm): 2020 / 11 / 11 / 02 08 : 30 — 1622

Date and time of ending (YYYY MM/DD hh:mm): 2020 / 11 / 20 17 : 00 — 1623

☐ Automatically delete fixed form document after date and time of ending — 1624

Register — 1625   Cancel — 1626

2000

IMAGE FORMING APPARATUS, METHOD OF CONTROLLING IMAGE FORMING APPARATUS, AND STORAGE MEDIUM

BACKGROUND OF THE INVENTION

Field of the Invention

The present disclosure relates to an image forming apparatus, a method of controlling an image forming apparatus, and a storage medium.

Description of the Related Art

There is a function called fixed form document printing as a method of easily printing a frequently used document or a document to be printed repeatedly when necessary (Japanese Patent Laid-Open No. 2018-129676).

In fixed form document printing, a frequently used document or a document to be printed repeatedly is registered and stored in advance in an image forming apparatus or the like as a fixed form document. When a fixed form document is registered, a button associated with the registered fixed form document on a one-to-one basis is displayed on a home screen of the image forming apparatus so that the registered fixed form document can be printed. A user can print a document registered as a fixed form document by pressing the button displayed on the home screen.

Regarding a fixed form document, the type of fixed form document (a shared document, a personal document) can be selected at the time of registration. A shared document can be referred to and printed by people other than a registrant of a fixed form document. An example of use can be conceived in which an administrator registers a document with a fixed format, such as an application form, as a shared document, and a person who needs it prints the document when necessary. A personal document can be referred to and printed only by a registrant of a fixed form document. An example of use can be conceived in which a document to be printed repeatedly is registered as a personal document, and a person who has registered the document prints it when necessary.

The registration of a fixed form document can be performed by an administration user having an administrator authority or a general user who does not have an administrator authority.

As a method of registering a fixed form document, there is a method of accessing an image forming apparatus using a web browser and registering a file such as a JPEG or PDF file. JPEG is an abbreviation for Joint Photographic Experts Group. PDF is an abbreviation for Portable Document Format. The image forming apparatus has a web server function. For this reason, a screen of a remote UI (software for managing the image forming apparatus) of the image forming apparatus is displayed by designating an URL (for example, an IP address) of the image forming apparatus from the web browser. In addition, an application of fixed form document printing is selected from the remote UI, and a desired file is registered in the image forming apparatus as a fixed form document. When a fixed form document is registered, printing settings to be applied during printing can also be registered. URL is an abbreviation for Uniform Resource Locator. IP address is an abbreviation for Internet Protocol address. UI is an abbreviation for User Interface.

As another method of registering a fixed form document, there is a method of registering a printing job stored in an image forming apparatus as a fixed form document. The image forming apparatus has a retainment printing function of retaining a printing job in a non-volatile storage region of the image forming apparatus without performing printing when receiving the printing job, and then performing printing by giving a printing instruction on an operation device of the image forming apparatus by a user. In the retainment printing, a retained printing job can be displayed in a printing job list. The user performs an operation of selecting a printing job from the printing job list and registering the selected printing job as a fixed form document to store the printing job in the image forming apparatus as a fixed form document.

Some fixed form documents are not always used, but are used for a limited time, such as application forms for limited time campaigns. If a fixed form document can be printed for a limited time, it is desirable to be able to use a button for printing the fixed form document only for a printable period. However, in order to perform such an operation, it is necessary to perform setting change so as to display the button for printing the fixed form document on an image forming apparatus when the printable period starts or perform setting change so as not to display the button when the printable period ends. Changing the settings with a timing in mind in this manner was burdensome work for an administrator.

SUMMARY OF THE INVENTION

The present invention provides an image forming apparatus including an operation device, one or more memories, and one or more processors that execute instructions to receive an instruction for registering a document in the one or more memories, register the document according to the instruction in the one or more memories, and control the operation device such that a function selection screen including a button for instructing execution of printing of the registered document is displayed, in which if the instruction received by a reception unit includes information indicating a printing valid period of the document according to the instruction, a button for instructing execution of printing of the document according to the instruction is displayed as being valid on the function selection screen in the printing valid period.

Further features of the present invention will become apparent from the following description of exemplary embodiments (with reference to the attached drawings).

BRIEF DESCRIPTION OF THE DRAWINGS

FIG. 9 is a diagram illustrating a registration screen for a new button of fixed form document printing.

FIGS. 10A and 10B are diagrams illustrating a bibliographic information list.

FIGS. 21A and 21B are diagrams illustrating an example of a printing job list screen.

DESCRIPTION OF THE EMBODIMENTS

Hereinafter, preferred modes for carrying out the present disclosure will be described using the drawings.

Example 1

Figure 1:
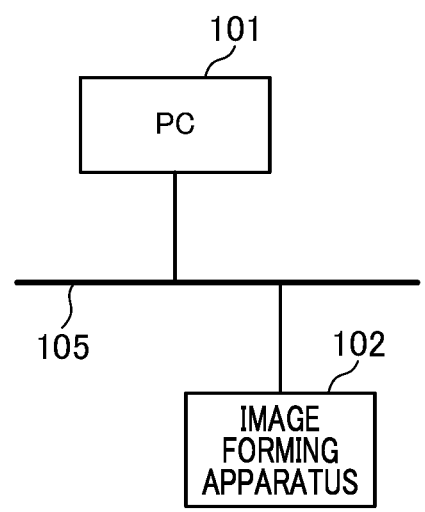
FIG. 1 is a diagram illustrating an example of a network configuration to which an image forming apparatus according to Example 1 of the present disclosure is connected.

FIG. 1 is a diagram illustrating an example of a network configuration to which an image forming apparatus according to Example 1 of the present disclosure is connected. In the present example, an example in which a fixed form document is registered in the image forming apparatus 102 from the PC 101, and the fixed form document is printed from the image forming apparatus 102 is described. PC is an abbreviation for Personal Computer.

The image forming apparatus 102 has a web server function. The PC 101 displays a screen of a remote UI of the image forming apparatus 102 by designating an URL of the image forming apparatus 102 from a web browser included therein. URL is an abbreviation for Uniform Resource Locator. UI is an abbreviation for User Interface.

In the PC 101, an application of fixed form document printing is selected from the remote UI, and a desired file is registered in the image forming apparatus 102 as a fixed form document. When the fixed form document is registered, a printable period of the fixed form document is also registered. The printable period is an example of a printing valid period.

The image forming apparatus 102 displays a button associated with the registered fixed form document on an operation device 207. At this time, control is performed so that the button is displayed only in the printable period of the fixed form document. When the button is pressed, the image forming apparatus 102 prints the fixed form document associated with the button. In this manner, the image forming apparatus 102 displays the button only in the printable period, and thus the image forming apparatus 102 capable of printing the fixed form document in a limited time can be provided.

The PC 101 to which a printing job is input and the image forming apparatus 102 that processes the input printing job are connected to the LAN 105. LAN is an abbreviation for Local Area Network. The number of PCs and image forming apparatuses connected to the LAN 105 is not limited to those in the mode illustrated in FIG. 1.

The image forming apparatus 102 manages bibliographic information for uniquely specifying a printing job which is input from the PC 101. Meanwhile, although an input source of a printing job is set to be the PC 101 in the present example, a device other than a PC (for example, a portable terminal, other image forming apparatuses, or the like) may be an input source of a printing job.

When a user performs user authentication in the image forming apparatus 102 and logs in, the image forming apparatus 102 acquires and displays a list of printing jobs that can be printed by the logged-in user. When the user selects a desired printing job from the displayed list, the image forming apparatus 102 acquires and prints printing data of the selected printing job.

Figure 2:
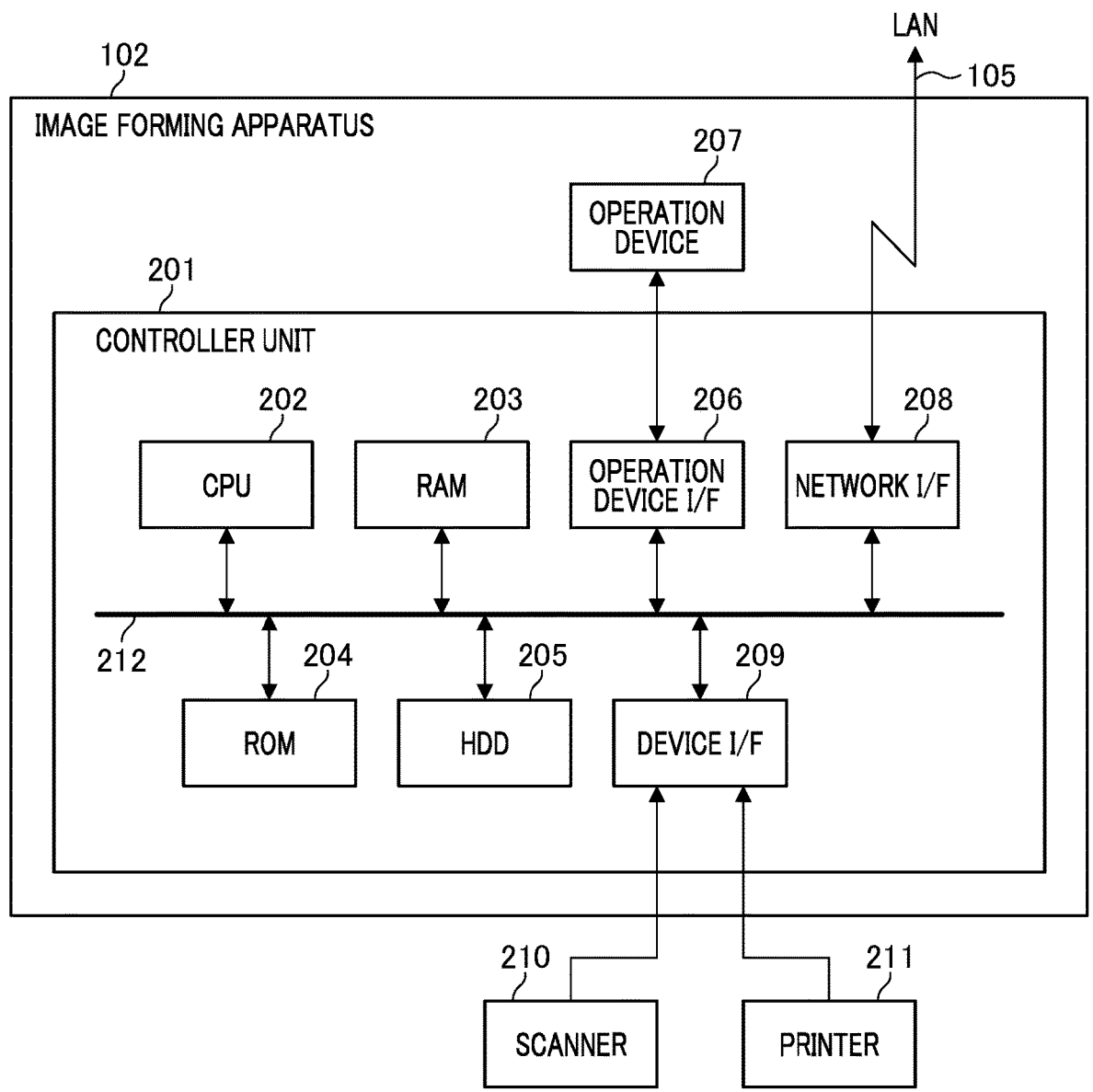
FIG. 2 is a block diagram illustrating the overall configuration of an image forming apparatus 102.

FIG. 2 is a block diagram illustrating the overall configuration of the image forming apparatus 102. The image forming apparatus 102 includes a controller unit 201 and an operation device 207. The operation device 207 performs displays for a user and receives the user's input of information.

The controller unit 201 includes a CPU 202. CPU is an abbreviation for Central Processing Unit. The controller unit 201 includes a system bus 212. The CPU 202 is connected to the system bus 212. The CPU 202 is an arithmetic device that controls the entire system of the image forming apparatus 102.

The controller unit 201 includes a RAM 203. The RAM 203 is an abbreviation for Random Access Memory. The RAM 203 is connected to the system bus 212. The RAM 203 is a system work memory for the CPU 202 to operate, and is an image memory for transitorily storing image data. In addition, programs such as an operating system, a system software and an application software, and data are also disposed in the RAM 203.

The controller unit 201 includes a ROM 204. ROM is an abbreviation for Read Only Memory. The ROM 204 is connected to the system bus 212. A boot program of a system is stored in the ROM 204.

The controller unit 201 includes an HDD 205. HDD is an abbreviation for Hard Disk Drive. The HDD 205 is connected to the system bus 212. The HDD 205 stores an operating system, system software, application software, image data, setting data, and the like. The controller unit 201 may use other storage devices such as an SSD, an SD memory card, or an eMMC instead of the HDD 205, as long as the devices can store data. SSD is an abbreviation for Solid State Drive. The SD memory card is an abbreviation for a Secure Digital memory card. eMMC is an abbreviation for embedded Multi Media Card. The HDD 205 is an example of a storage unit.

The controller unit 201 includes an operation device I/F 206. I/F is an abbreviation for Interface. The operation device I/F 206 is connected to the system bus 212. The operation device I/F 206 is an interface unit with respect to the operation device 207. The operation device i/F 206 outputs information to be displayed on the operation device 207 to the operation device 207. In addition, the operation device I/F 206 receives information which is input from the operation device 207 by the user.

The controller unit 201 includes a network I/F 208. The network I/F 208 is connected to the system bus 212. The network I/F 208 is connected to the LAN 105 and inputs and outputs information to and from a PC or another image forming apparatus connected to the same LAN.

The controller unit 201 includes a device I/F 209. The device I/F 209 is connected to the system bus 212. The device I/F 209 connects a scanner 210, which is an image input and output device, and a printer 211 to the controller unit 201 to input and output image data.

Figure 3:
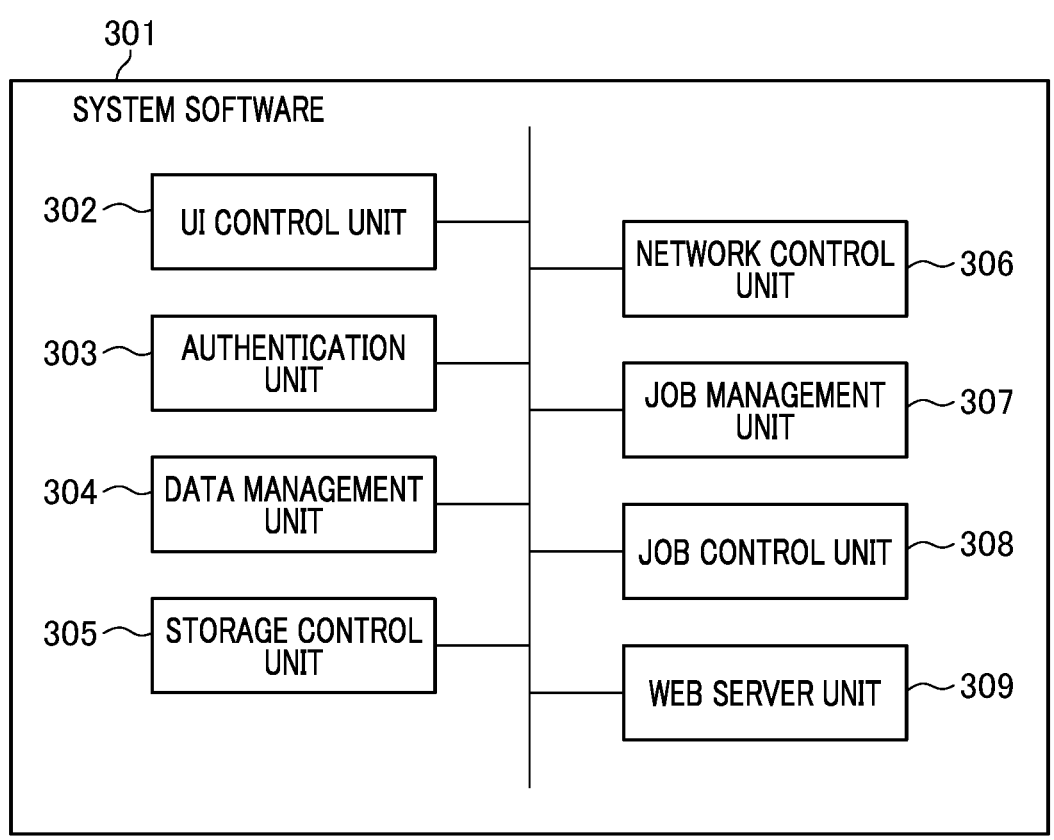
FIG. 3 is a block diagram illustrating a configuration of system software of the image forming apparatus 102.

FIG. 3 is a block diagram illustrating a configuration of system software of the image forming apparatus 102. A system software 301 is stored in any one storage unit among the RAM 203, the ROM 204, and the HDD 205 and is executed by the CPU 202. The system software 301 includes a UI control unit 302, an authentication unit 303, a data management unit 304, a storage control unit 305, a network control unit 306, a job management unit 307, a job control unit 308, and a web server unit 309.

The UI control unit 302 receives information input on the operation device 207 by a user through the operation device I/F 206 and transmits the received information to the authentication unit 303, the data management unit 304, and the job management unit 307. In addition, the UI control unit 302 receives responses from the authentication unit 303, the data management unit 304, and the job management unit 307 and outputs the received responses to the operation device 207 through the operation device D/F 206.

The authentication unit 303 performs user authentication processing on the basis of authentication information received from the UI control unit 302 and returns the result thereof to the UI control unit 302.

The data management unit 304 receives a data write request and a data read request from the UC control unit 302, the network control unit 306, the job management unit 307, and the web server unit 309. The data management unit 304 transmits a data write request and a data read request to the storage control unit 305 in response to the received data write request and data read request. In addition, the data management unit 304 receives a response from the storage control unit 305 and transmits the received response to the UI control unit 302, the network control unit 306, the job management unit 307, and the web server unit 309.

The storage control unit 305 receives the data write request and the data read request from the data management unit 304 to write data and read data to and from the HDD 205, and returns the result thereof to the data management unit 304.

The network control unit 306 receives a request from the PC 101 or any image forming apparatus connected to the LAN 105 through the network I/F 208. In addition, the network control unit 306 requests the data management unit 304, the job management unit 307, and the web server unit 309 to perform processing in response to the received request. In addition, the network control unit 306 receives responses from the data management unit 304, the job management unit 307, and the web server unit 309. In addition, the network control unit 306 transmits the received responses to the PC 101 or any image forming apparatus connected to the LAN 105 through the network I/F 208.

The job management unit 307 receives job execution requests from the UI control unit 302, the network control unit 306, and the web server unit 309 and manages jobs. In addition, the job management unit 307 requests the job control unit 308 to execute a job. In addition, the job management unit 307 transmits a data write request and a data read request to the data management unit 304. In addition, the job management unit 307 receives a response from the data management unit 304 and the job control unit 308 and transmits the state of a job to the UI control unit 302, the network control unit 306, and the web server unit 309.

The job control unit 308 receives a job execution request from the job management unit 307 and controls the operations of the scanner 210 and the printer 211 through the device I/F 209. In addition, the job control unit 308 receives the operation states of the scanner 210 and the printer 211 through the device I/F 209 and transmits the received operation states to the job management unit 307.

The web server unit 309 receives a Hyper Text Transfer Protocol (HTTP) request from the network control unit 306. In addition, the web server unit 309 analyzes received data and requests the data management unit 304 and the job management unit 307 to perform processing in accordance with analysis results. In addition, the web server unit 309 receives responses from the data management unit 304 and the job management unit 307. In addition, the web server unit 309 transmits the received responses to the network control unit 306.

Figure 4:
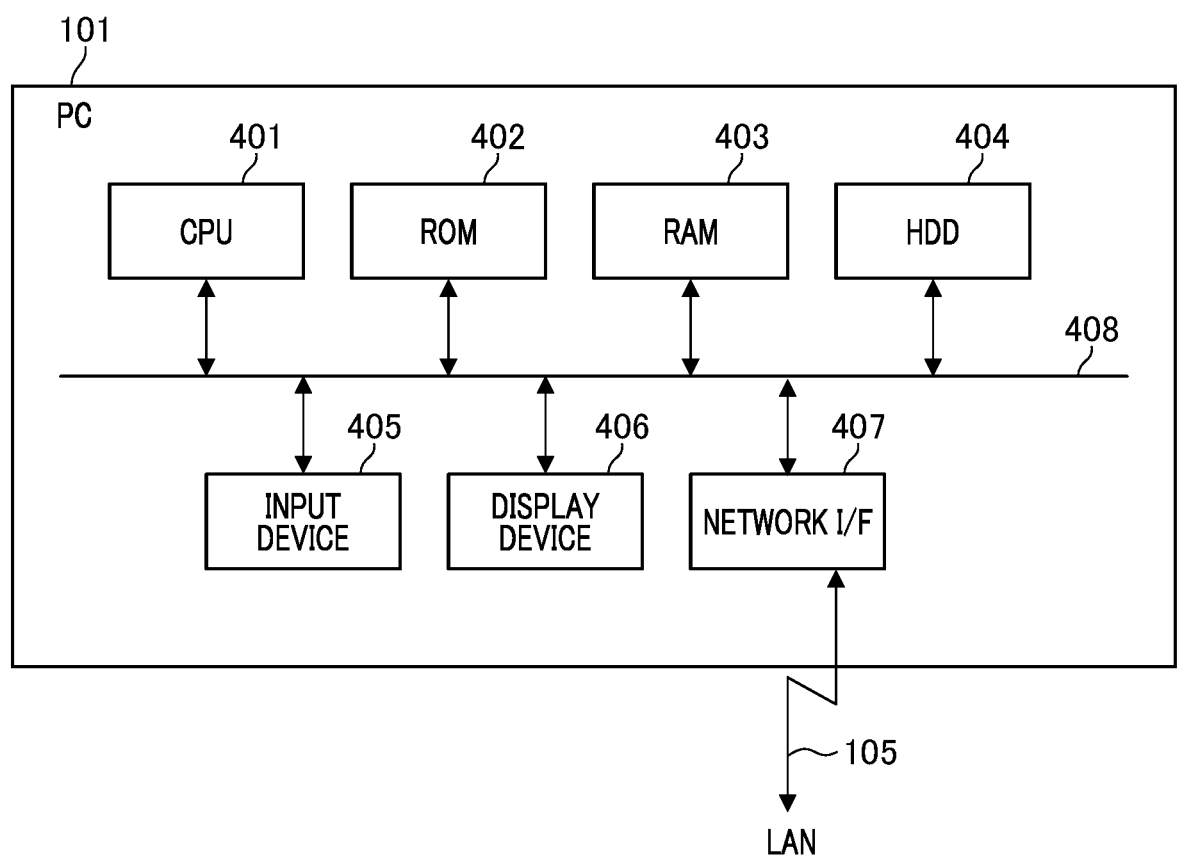
FIG. 4 is a block diagram illustrating the overall configuration of a PC 101.

FIG. 4 is a block diagram illustrating the overall configuration of the PC 101. The PC 101 includes a CPU 401, a ROM 402, a RAM 403, an HDD 104, an input device 405, a display device 406, a network/F 407, and a system bus 408. The CPU 401, the ROM 402, the RAM 403, the HDD 104, the input device 405, the display device 406, and the network I/F 407 are connected to the system bus 408.

The CPU 401 is an arithmetic device that controls the entire system of the PC 101. The ROM 402 stores programs and data related to each processing. The RAM 403 is a system work memory for the CPU 401 to operate, and is a storage memory that stores transitory data related to each processing. The HDD 404 stores programs and data related to each processing, transitory data, application data, and the like. The input device 405 is a keyboard or a pointing device that receives an input of an instruction given to the PC 101. The display device 406 displays operation conditions of the PC 101 and information output by programs operating on the present apparatus. The network I/F 407, which is connected to the LAN 105, inputs and outputs information to and from another PC or image forming apparatus connected to the LAN 105.

Meanwhile, the CPU 401 executes processing on the basis of programs corresponding to an operating system (OS), a printer driver, and an application stored in the HDD 404, whereby functions (or processing) of the OS and the printer driver are realized.

Figure 5:
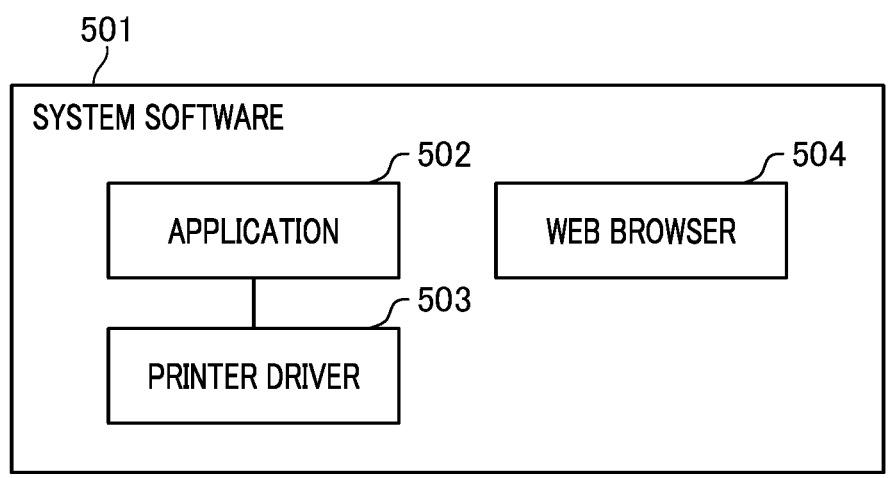
FIG. 5 is a block diagram illustrating a configuration of system software of the PC 101.

FIG. 5 is a block diagram illustrating a configuration of the system software of the PC 101. System software 501 is stored in any one storage unit among the ROM 402, the RAM 403, and the HDD 404 and is executed by the CPU 401. The system software 501 includes an application 502, a printer driver 503, and a web browser 504.

The application 502 is a tool for creating and editing images and documents using the input device 405 such as a pointing device or a keyboard, for example, while a user views the display device 406 of the PC 101. The user creates data such as images and documents using the application 502, creates printing command data using the printer driver 503, and transmits the created data to a printable apparatus such as the image forming apparatus 102.

The web browser 504 requests the web server unit 309 to acquire a web content. In addition, the web browser 504 provides a function of analyzing HTML of the web content acquired from the web server unit 309 and displaying the analyzed data on the display device 406, a function of analyzing and executing JAVASCRIPT (registered trademark), and the like. Meanwhile, the web browser 504 can also display the web content acquired from a web server other than the web server unit 309 on the display device 406.

Figure 6:
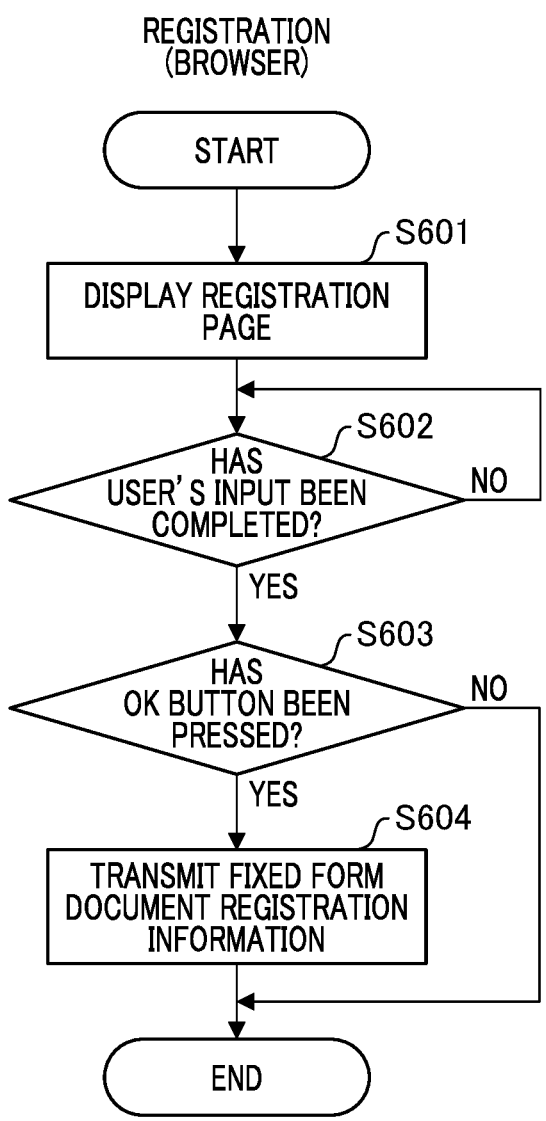
FIG. 6 is a flowchart illustrating fixed form document registration processing.

Hereinafter, processing in which a user operates the web browser 504 of the PC 101 and registers a fixed form document in the image forming apparatus 102 will be described. FIG. 6 is a flowchart illustrating fixed form document registration processing which is executed by the CPU 401 of the PC 101. The user operates the web browser 504 using the input device 405 such as a pointing device or a keyboard while viewing the display device 406 and registers a fixed form document.

The user displays a screen of a remote UI of an image forming apparatus by designating an URL (for example, an IP address) of the image forming apparatus in the web browser 504. IP address is an abbreviation for Internet Protocol address. In addition, the user selects the application 502 which is an application of fixed form document printing from the remote UI, and the PC 101 displays a management screen 801 (see FIG. 8A) which is a management screen for registration information of fixed form document printing.

Figure 8A:
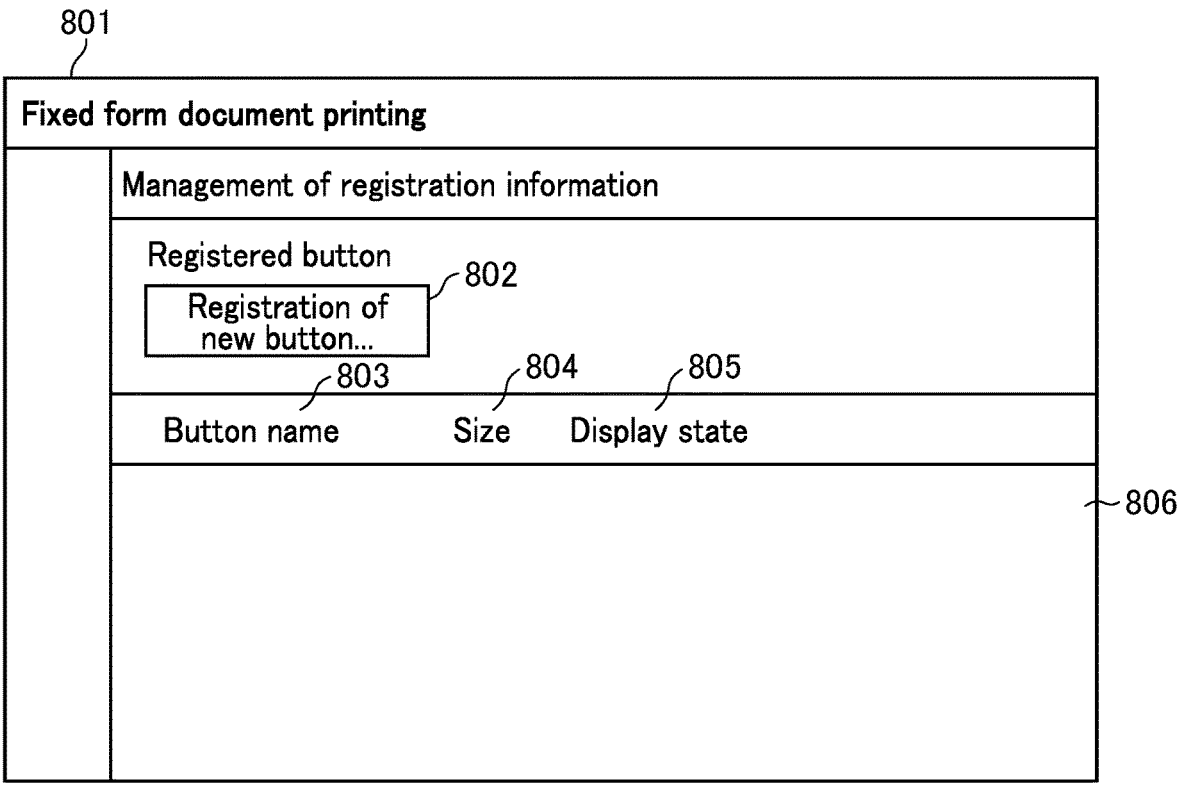
FIGS. 8A and 8B are diagrams illustrating a management screen for registration information of fixed form document printing.

FIG. 8A is a diagram illustrating a management screen for registration information of fixed form document printing. Information on registration conditions of a fixed form document is displayed in a confirmable manner on the management screen 801 which is a management screen for registration information of fixed form document printing. The information on registration conditions of a fixed form document includes a button name 803 at the time of displaying a button on the operation device 207, a document size 804, a button display state 805, and the like which are associated with a registered document. If no fixed form document is registered, nothing is displayed on a display unit 806.

In addition, a registration button 802 for a new button for adding a document as a fixed form document is displayed on the management screen 801. When the registration button 802 for a new button is pressed, the web browser 504 displays a registration screen 901 (see FIG. 9) which is a registration screen for a new button (S601). As in S601 of FIG. 6, the registration screen 901 may be referred to as a registration page.

FIG. 9 is a diagram illustrating a registration screen for a new button. A text box 902 for inputting a button name is displayed as a basic setting on the registration screen 901 which is a registration screen for a new button. In addition, a reference button 904 for designating a document to be registered is displayed on the registration screen 901. In addition, a text box 903 for inputting and displaying a path of a file indicating a storage location and a file name of a document to be registered is displayed on the registration screen 901.

In addition, a radio button 905 for selecting the type of fixed form document to be registered is displayed on the registration screen 901. When a shared document is selected with the radio button 905, the shared document is registered as a document that can be referred to and printed by a person other than a registrant of a fixed form document. When a personal document is selected with the radio button 905, the personal document is registered as a document that can be referred to and printed by only a registrant of a fixed form document.

In addition, a text box 906 for inputting the date and time of staring of a printable period of a document to be registered, and a text box 907 for inputting the date and time of ending of the printable period are displayed on the registration screen 901 in order to designate the printable period. However, this is an example for designating a printable period, and thus a unit for designating a printable period is not limited thereto. For example, only the dates of starting and ending of the printable period may be displayed. In addition, a period of time for the printable period may be displayed in hours, minutes, and seconds. In addition, only the date and time of starting or the date and time of ending of the printable period may be displayed.

In addition, a check box 908 for automatically deleting a document to be registered is displayed on the registration screen 901 if the date and time of ending of a printable period of the document to be registered has elapsed. In general, it is necessary to press the deletion button 808 in order to delete a registered fixed form document, but a registered fixed form document can be automatically deleted by checking the check box 908 if the date and time of ending set in the text box 907 has elapsed. That is, the check box 908 may be checked for the purpose of using the fixed form document in a limited time. That is, the check box 908 for setting whether to delete a document to be registered is displayed on the registration screen 901 when a printing valid period of the document to be registered has ended. Means for setting using the check box 908 is an example of a deletion setting unit.

On the other hand, if the fixed form document is used on a regular basis (for example, from the 1st to the 3rd of every month, or from the 2nd to the 20th of November every year) even for the purpose of using the fixed form document in a limited time, the check box 908 may not be checked. In this case, it is preferable to make it possible to set a regular printable period on a screen on which a regular printable period can be set which is not illustrated here. That is, a printing valid period of a registered document includes a plurality of printing valid periods that arrive regularly.

A radio button 920 for performing double-sided setting as printing setting (displayed as print setting on the screen) is displayed on the registration screen 901 for a new button. When a double-side is selected with the radio button 920, printing setting for performing printing on both sides of paper is registered. When a single-side is selected with the radio button 920, printing setting for performing printing on a single side of paper is registered.

In addition, a radio button 921 for performing color mode setting is displayed on the registration screen 901. When automation is selected with the radio button 921, setting for performing switching between color and monochrome according to a page of a document is registered. When the color is selected with the radio button 921, printing setting of color is registered. When the monochrome is selected with the radio button 921, printing setting of monochrome is registered.

In addition, a text box 922 for setting of the number of copies is displayed on the registration screen 901. The number of copies to be printed is registered with the text box 922.

In addition, an OK button 940 is displayed on the registration screen 901. When the OK button 940 is pressed, a document, basic setting, and printing setting which are input by a user are transmitted to the image forming apparatus 102, and fixed form document printing is registered. In addition, a cancellation button 941 is displayed on the registration screen 901. When the cancellation button 941 is pressed, the user's input is cancelled, and the screen transitions to the management screen 801 which is a management screen for registration information of fixed form document printing.

The web browser 504 waits for the completion of the user's input (S602). When the OK button 940 or the cancellation button 941 is pressed, the web browser 504 determines that the user's input has been completed. When the user's input has been completed, the web browser 504 determines whether or not the OK button 940 has been pressed (S603).

If the OK button has been pressed (S603: Yes), the web browser 504 transmits fixed form document registration information (a document, basic setting, and printing setting which are designated with the text box 903 by the user) to the image forming apparatus 102 (S604), and terminates the processing. If a pressed button is not the OK button (S603: No), that is, if the cancellation button 941 has been pressed, the web browser 504 terminates the processing.

Figure 8B:
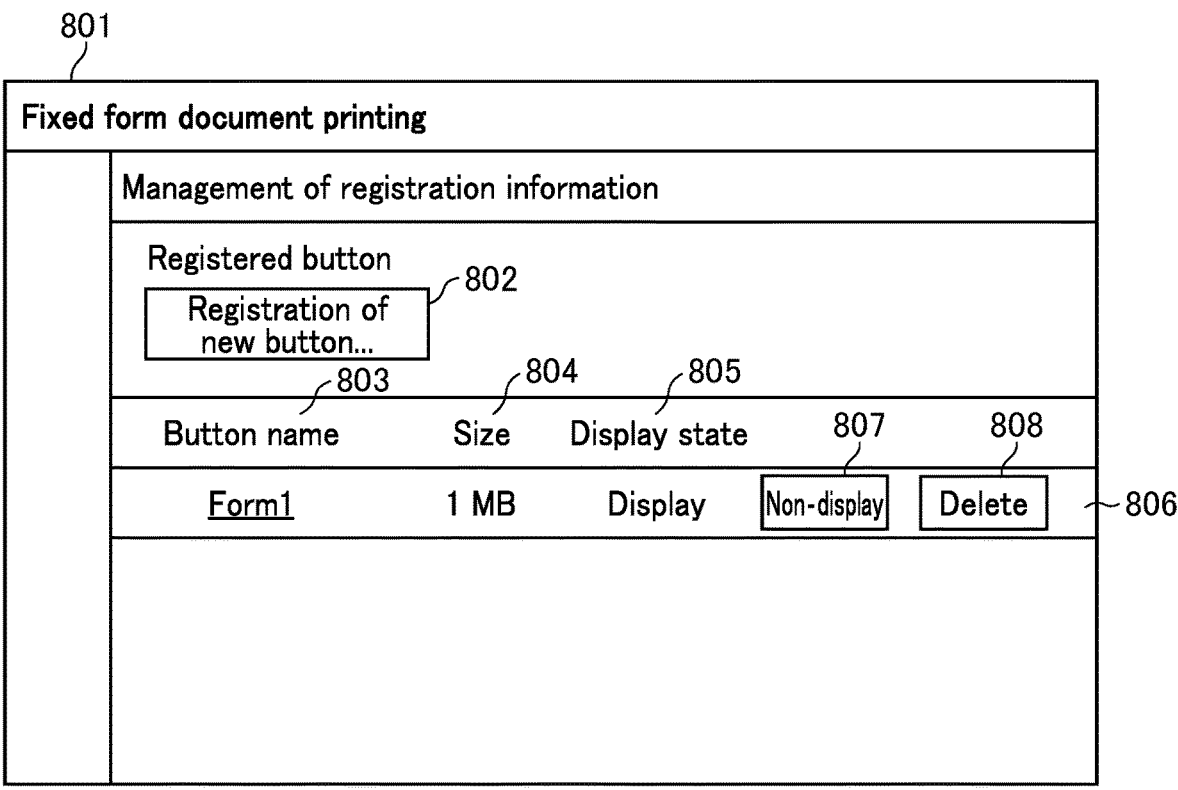

FIG. 8B is a diagram illustrating a management screen for registration information of fixed form document printing. If a fixed form document has been registered, the web browser 504 displays information on the registered fixed form document on the display unit 806 of the management screen 801.

A display and non-display change button 807 is displayed on the management screen 801. The display and non-display change button 807 is a button for changing a display mode and a non-display mode of a fixed form document button to be described later. If the fixed form document button is displayed, the display and non-display change button 807 is displayed as a non-display mode, and if the fixed form document button is set to be in a non-display mode, the display and non-display change button 807 is displayed as a display mode.

If the display and non-display change button 807 is pressed, the web browser 504 transmits the fact that the display and non-display change button 807 has been pressed to the image forming apparatus 102. When the image forming apparatus 102 receives the transmitted information, the image forming apparatus 102 changes a display mode to a non-display mode if the fixed form document button is set to be in a display mode, and changes a non-display mode to a display mode if the fixed form document button is set to be in a non-display mode.

The deletion button 808 is displayed on the management screen 801. The deletion button 808 is a button for deleting information on the fixed form document registered in the image forming apparatus 102.

When the deletion button 808 is pressed, the web browser 504 transmits the fact that the deletion button 808 has been pressed to the image forming apparatus 102. When the image forming apparatus 102 receives the transmitted information, the image forming apparatus 102 deletes information on the corresponding fixed form document. In addition, if the deletion button 808 has been pressed, the web browser 504 deletes information on the corresponding fixed form document button displayed on the display unit 806.

Figure 7:
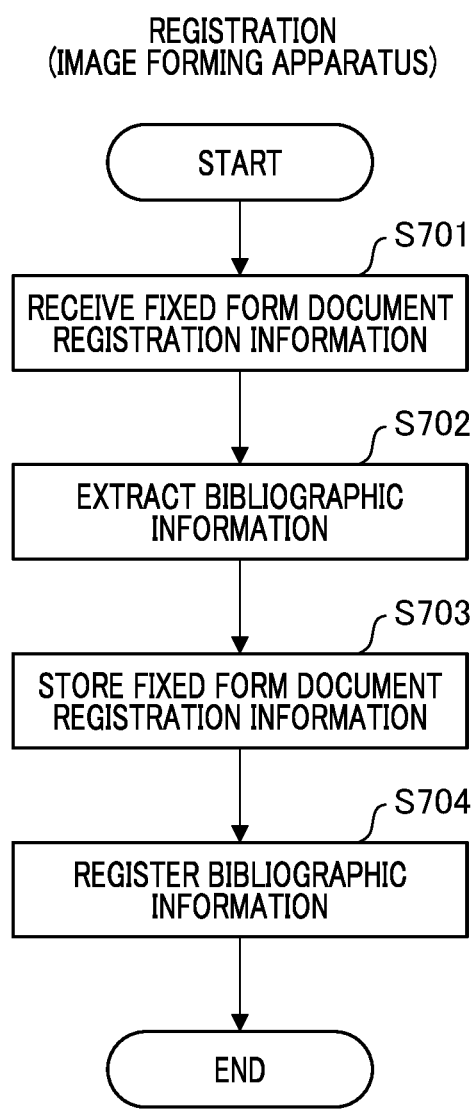
FIG. 7 is a flowchart illustrating fixed form document registration processing.

Next, processing in which fixed form document registration information transmitted from the PC 101 is registered in the image forming apparatus 102 will be described using FIG. 7. FIG. 7 is a flowchart illustrating registration processing for a fixed form document which is executed by the CPU 202 of the image forming apparatus 102.

If the network control unit 306 receives fixed form document registration information from the PC 101 (S701), the network control unit 306 transmits the received fixed form document registration information to the job management unit 307. When the job management unit 307 receives the fixed form document registration information, the job management unit 307 transmits the received fixed form document registration information to the data management unit 304. The data management unit 304 analyzes the fixed form document registration information received from the job management unit 307 and extracts bibliographic information (S702). The bibliographic information will be described later. The data management unit 304 transmits the fixed form document registration information and the extracted bibliographic information to the storage control unit 305. The storage control unit 305 stores the received fixed form document registration information and the extracted bibliographic information in the HDD 205 (S703, S704).

FIG. 10A is a diagram illustrating an example of a bibliographic information list 1001 stored in the HDD 205. The bibliographic information list 1001 collectively manages bibliographic information of the above-described fixed form document and bibliographic information of a retained printing job input to the image forming apparatus 102 to be described later. However, the present disclosure is not limited thereto, and bibliographic information of a fixed form document and bibliographic information of a retained printing job may be managed separately.

FIG. 10B is an example illustrating bibliographic information 1023 to bibliographic information 1027, which are to be described later, being added to the bibliographic information list 1001 in FIG. 10A.

The bibliographic information list 1001 includes a date and time 1002 when a fixed form document was registered, a user name 1003 of a person who registered a fixed form document, a storage location 1004 of a registered fixed form document, a printing job name 1005, a printing setting 1006, and a printing job type 1007. The bibliographic information list 1001 further includes a starting date and time 1008 of a printable period, a ending date and time 1009 of a printable period, a deletion at ending 1010 indicating whether or not to automatically delete a fixed form document after an ending date and time, a button name 1011, and a fixed form document type 1012.

The registration date and time 1002 is the date and time when a fixed form document was added.

The user name 1003 is a user name of a person who registered a fixed form document.

The storage location 1004 is a location where fixed form document registration information was stored.

The printing job name 1005 is a file name of a fixed form document and is stored on the basis of a value input with the text box 903 regarding a path of a file.

The printing setting 1006 is a printing setting which is used when a fixed form document is printed, and values that are input with the radio button 920 for double-sided printing, the radio button 921 for a color mode, and the text box 922 for setting the number of copies are stored.

The printing job type 1007 is a value representing the type of registered printing job and is stored on the basis of the type of printing job received. A fixed form document is stored in the printing job type 1007 if it is registered as a fixed form document. For a printing job input from a printer driver or the like, normal is stored in the printing job type 1007. Security is stored in the printing job type 1007 for a printing job which is input from a printer driver or the like and for which a password has been set. Encrypted security is stored in the printing job type 1007 for a printing job which is encrypted and input.

The starting date and time 1008 is the date and time when a printable period of a fixed form document starts, and a value input with the text box 906 for the date and time of starting is stored.

The ending date and time 1009 is the date and time when a printable period of a fixed form document ends, and a value input with the text box 907 for the date and time of ending is stored.

The deletion at ending 1010 is a setting for determining whether or not to automatically delete a registered fixed form document when the date and time of ending of a printable period of a fixed form document has elapsed, and is stored on the basis of a setting value of the check box 908 regarding whether or not to automatically delete a fixed form document after the date and time of ending has elapsed. If the check box 908 is checked, YES is stored in the deletion at ending 1010, and if the check box 908 is not checked, NO is stored in the deletion at ending 1010.

The button name 1011 is a button name used when a fixed form document button is displayed on a home screen to be described later, and a value input with the text box 902 for the button name is stored.

The fixed form document type 1012 is a value representing the type of fixed form document, and a value input with the radio button 905 for the type of fixed form document is stored.

Bibliographic information to be registered in the bibliographic information list 1001 is not limited to that illustrated in FIG. 10A, and may include, for example, paper size of a printing job, and the like. Bibliographic information 1021 and bibliographic information 1022 are examples of bibliographic information registered in S704 of FIG. 7 when User1 has registered a fixed form document.

Next, processing in which a fixed form document button for printing a fixed form document registered in the HDD 205 is displayed on the operation device 207 will be described using FIG. 11. In the present example, a user operates the image forming apparatus 102 to perform user authentication and logs on the image forming apparatus 102. In addition, an example in which a home screen including a fixed form document button is displayed on the operation device 207 on the basis of the login will be described. However, a user authentication method is not limited thereto, and other authentication methods such as IC card authentication may be used.

Figure 11:
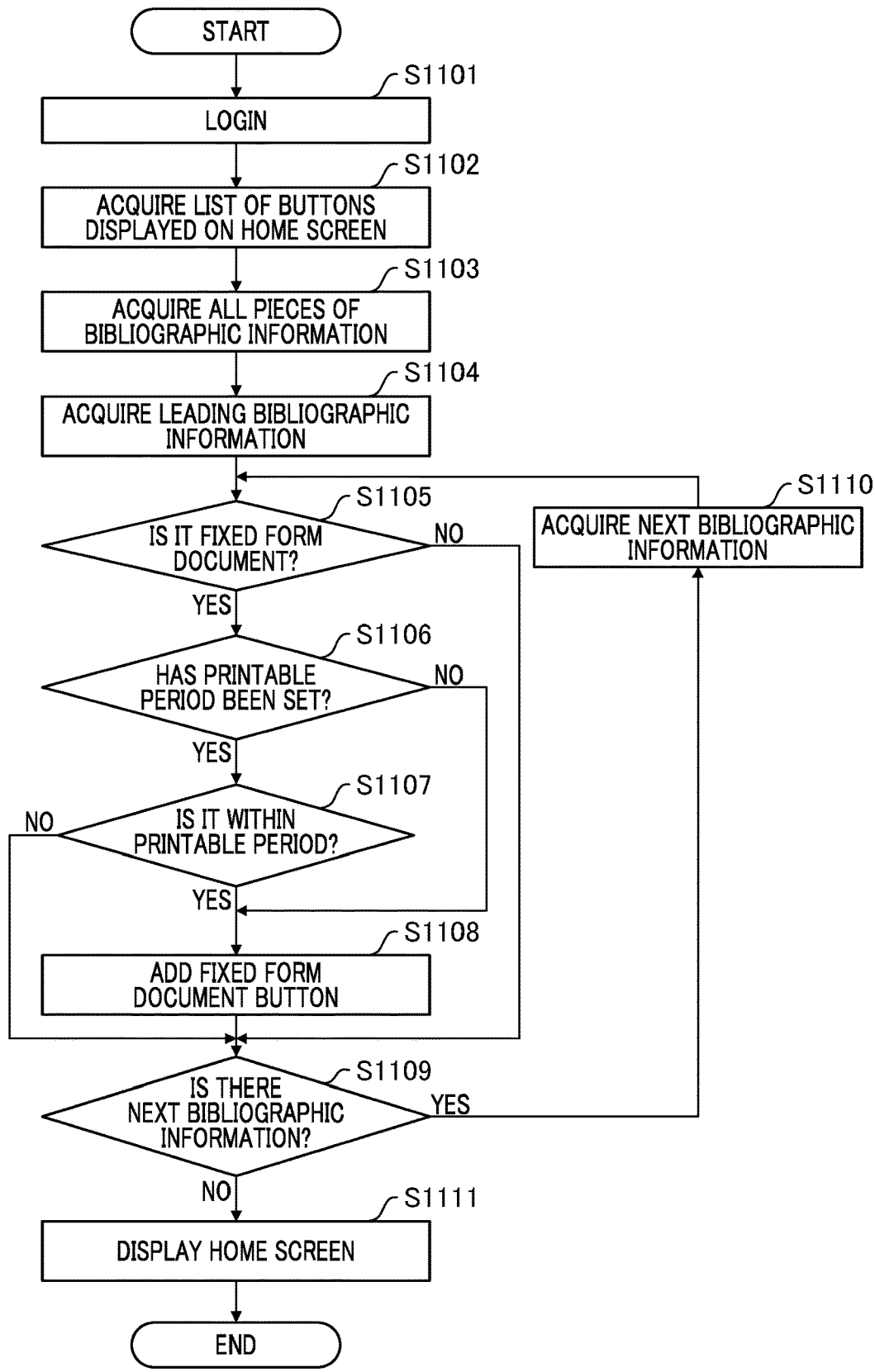
FIG. 11 is a flowchart illustrating processing for displaying a fixed form document button on an operation device.

FIG. 11 is a flowchart illustrating processing for displaying a fixed form document button on an operation device, the processing being executed by the CPU 202 of the image forming apparatus 102. The UI control unit 302 displays a user authentication screen illustrated in FIG. 12.

Figure 12:
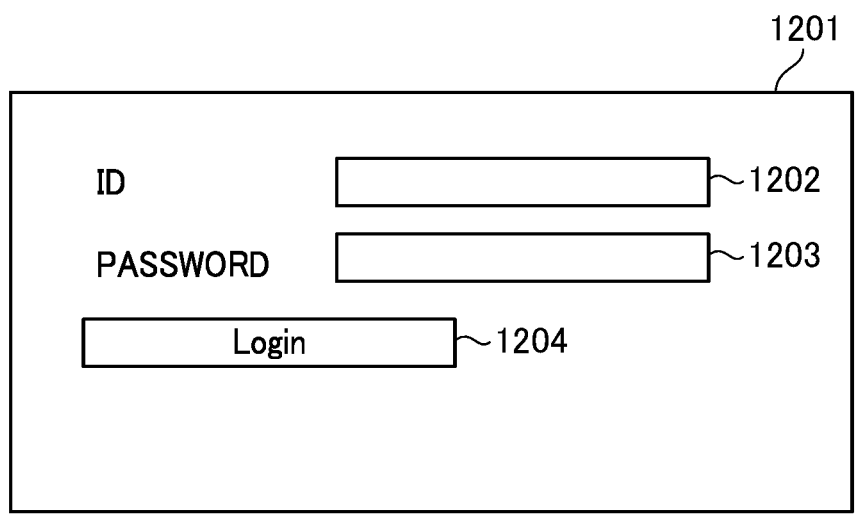
FIG. 12 is a diagram illustrating an example of a user authentication screen.

FIG. 12 is an example of a user authentication screen displayed on the operation device 207 by the UI control unit 302. A user inputs an ID 1202 and a PASSWORD 1203 on a user authentication screen 1201 and presses a login button 1204 to log on the image forming apparatus 102.

The UI control unit 302 receives information (user authentication information) input on the user authentication screen 1201 by the user and transmits the received information to the authentication unit 303. The authentication unit 303 performs user authentication by collating the user authentication information with a user management list (not illustrated). If user authentication has been successful, the authentication unit 303 allows the user to log on the image forming apparatus 102 (S1101). The authentication unit 303 transmits a result of the user authentication to the UI control unit 302.

When the user's login has been successful, the UI control unit 302 acquires a list of buttons displayed on the home screen from the storage control unit 305 through the data management unit 304 (S1102). The buttons displayed on the home screen may be buttons that have been defined in advance, or if there is a personal setting of a logged-in user, the personal setting may be used.

The UI control unit 302 acquires the all pieces of bibliographic information 1001 from the storage control unit 305 through the data management unit 304 (S1103). The UI control unit 302 processes and determines all of the pieces of bibliographic information 1001 in order, and thus the UI control unit 302 acquires the leading bibliographic information 1021 (S1104).

The UI control unit 302 determines whether or not the printing job type 1007 of the acquired bibliographic information 1021 is a fixed form document (S1105). As a result of the determination in S1105, if the printing job type 1007 is not a fixed form document, the UI control unit 302 determines whether or not the bibliographic information list 1001 includes the next bibliographic information (S1109).

As a result of the determination in S1105, if the printing job type 1007 is a fixed form document, the UI control unit 302 determines whether or not a printable period has been set (S1106). This is determined in accordance with whether the starting date and time 1008 has been set, whether the ending date and time 1009 has been set, or whether both of them have been set.

As a result of the determination in S1106, if a printable period has not been set, the UI control unit 302 adds a fixed form document button to the button list displayed on the home screen (S1108). As a result of the determination in S1106, if a printable period has been set, the UI control unit 302 determines whether or not the present date and time is within the printable period (S1107). The UI control unit 302 performs determination by acquiring the present date and time from a system service (not illustrated) of the image forming apparatus 102 and comparing the present date and time with the starting date and time 1008 and the ending date and time 1009. Specifically, if the present date and time is prior to the starting date and time 1008 or if the present date and time is later than the ending date and time 1009, the UI control unit 302 determines that the present date and time is not within the printable period. In addition, if the present date and time is between the starting date and time 1008 and the ending date and time 1009 (including the starting date and time 1008 and the ending date and time 1009), the UI control unit 302 determines that the present date and time is within the printable period. For example, if the present date and time is 2020/10/27 12:34:56, the UI control unit 302 determines that the present date and time is not within the printable period for the bibliographic information 1021 of the fixed form document. In addition, if the present date and time is 2020/11/21 12:34:56, the UI control unit 302 determines that the present date and time is not within the printable period for the bibliographic information 1021 of the fixed form document. In addition, if the present date and time is 2020/11/12 12:34:56, the UI control unit 302 determines that the present date and time is within the printable period for the bibliographic information 1021 of the fixed form document.

As a result of the determination in S1107, if it is determined that the present date and time is within the printable period, the UI control unit 302 adds a fixed form document button to the button list displayed on the home screen (S1108). As a result of the determination in S1107, if it is determined that the present date and time is not within the printable period, the UI control unit 302 does not add a fixed form document button to the button list displayed on the home screen.

The processing of the present bibliographic information 1021 ends here, and the UI control unit 302 determines whether or not the bibliographic information list 1001 includes the next bibliographic information (S1109). As a result of the determination in S1109, if the bibliographic information list 1001 includes the next bibliographic information, the UI control unit 302 acquires the next bibliographic information (S1110) and returns to the determination in S1105. As a result of the determination in S1109, if the bibliographic information list 1001 does not include the next bibliographic information, the UI control unit 302 displays a home screen including a list of buttons to be displayed on the home screen on the operation device 207 (S1111).

Figure 13A:
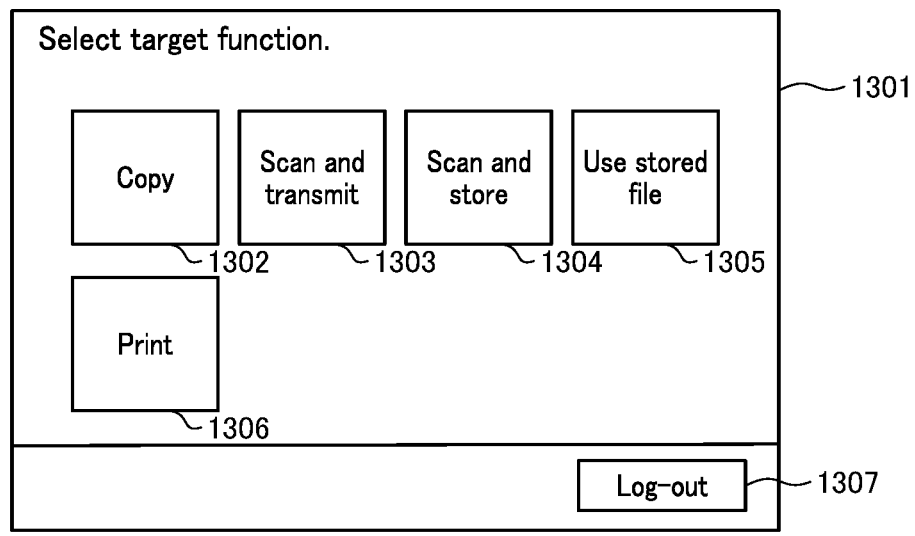
FIGS. 13A, 13B, and 13C are diagrams illustrating an example of a home screen.
Figure 13B:
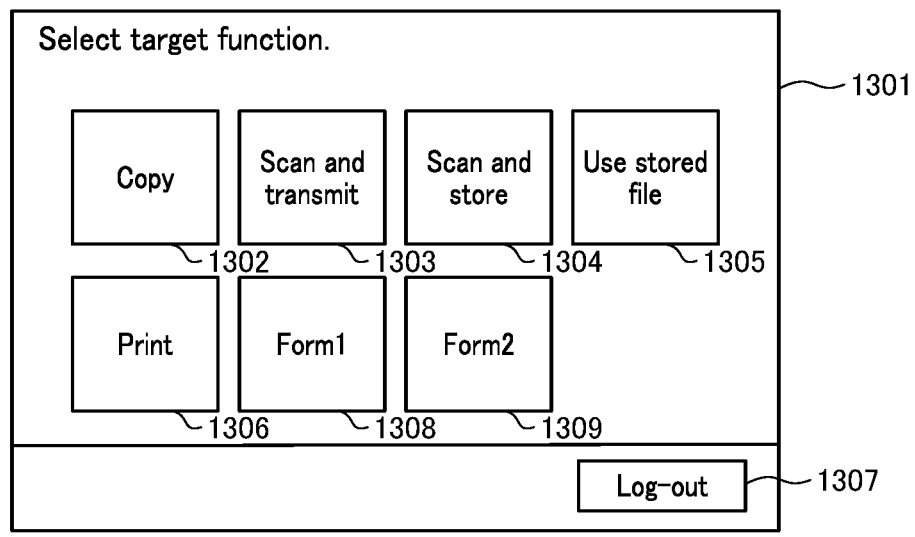
Figure 13C:
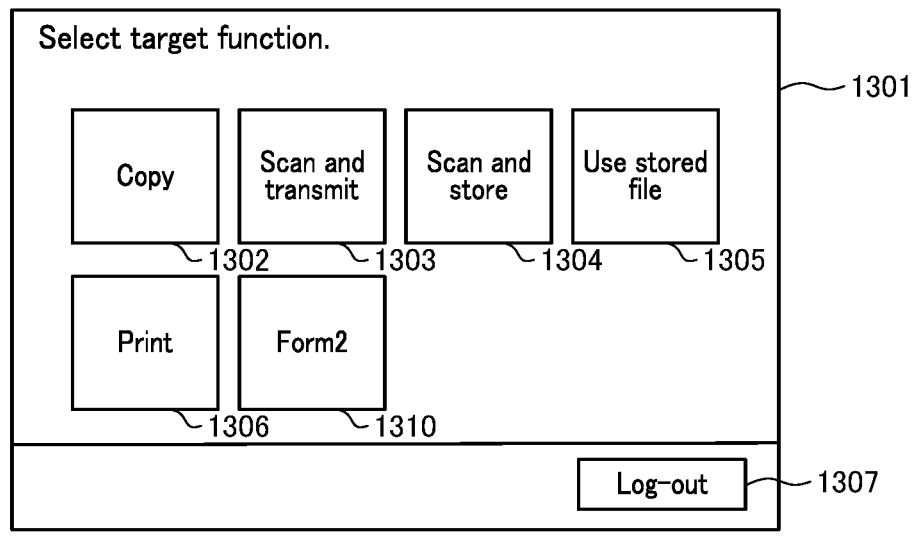

FIGS. 13A, 13B, and 13C are examples of the home screen which is displayed after the flowchart of FIG. 11 has been performed. Any of the drawings is an example in which buttons of a copy 1302, a scan and transmit 1303, a scan and store 1304, a use stored file 1305, and a print 1306 can be acquired in S1102. A log-out 1307 is a button for a user to log out of the image forming apparatus 102.

FIG. 13A is an example of a home screen 1301. In the present screen, a user can select a function that he or she desires to use. When the user selects any one button from the copy 1302 to the print 1306, the UI control unit 302 displays a function screen (not illustrated) corresponding to each button. The home screen 1301 is an example in a case where none of the bibliographic information 1021 of the fixed form document and the bibliographic information 1022 of the fixed form document are within the printable period. Since none of the fixed form documents are within the printable period, buttons for the bibliographic information 1021 and 1022 are not displayed on the home screen 1301 in FIG. 13A, and the user cannot print the fixed form documents.

FIG. 13B is an example of the home screen 1301. The present screen is an example in a case where both the bibliographic information 1021 of the fixed form document and the bibliographic information 1022 of the fixed form document are within the printable period. A Form 1 button 1308 is a fixed form document button and is equivalent to the bibliographic information 1021. In addition, a Form 2 button 1309 is a fixed form document button and is equivalent to the bibliographic information 1022. Since both the fixed form documents of the bibliographic information 1021 and 1022 are within the printable period, the Form 1 button 1308 and the Form 2 button 1309 are displayed on the home screen 1301 in FIG. 13B, and a user can print the fixed form documents.

FIG. 13C is an example of the home screen 1301. The present screen is an example of a screen when the bibliographic information 1021 of the fixed form document is not within a printable period while the bibliographic information 1022 of the fixed form document is within the printable period. A button (Form1) for the bibliographic information 1021 of the fixed form document is not displayed on the home screen 1301 in FIG. 13C. On the other hand, a Form 2 button 1310 is a fixed form document button and is equivalent to the bibliographic information 1022. Since the bibliographic information 1021 of the fixed form document is not within the printable period, a button is not displayed on the home screen 1301 in FIG. 13C, and a user cannot perform printing. On the other hand, since the bibliographic information 1022 of the fixed form document is within the printable period, the Form 2 button 1310 is displayed on the home screen 1301 in FIG. 13C, and the user can perform printing.

Meanwhile, in the examples of FIGS. 13A and 13C, if it is determined that the present date and time is not within the printable period as a result of the determination in S1107, the UI control unit 302 does not add a fixed form document button to the button list displayed on the home screen. However, as another example, a button is displayed if it is determined that the present date and time is not within the printable period, but a gray-out display may be performed so that a user cannot press it. This example is illustrated in FIG. 14.

Figure 14:
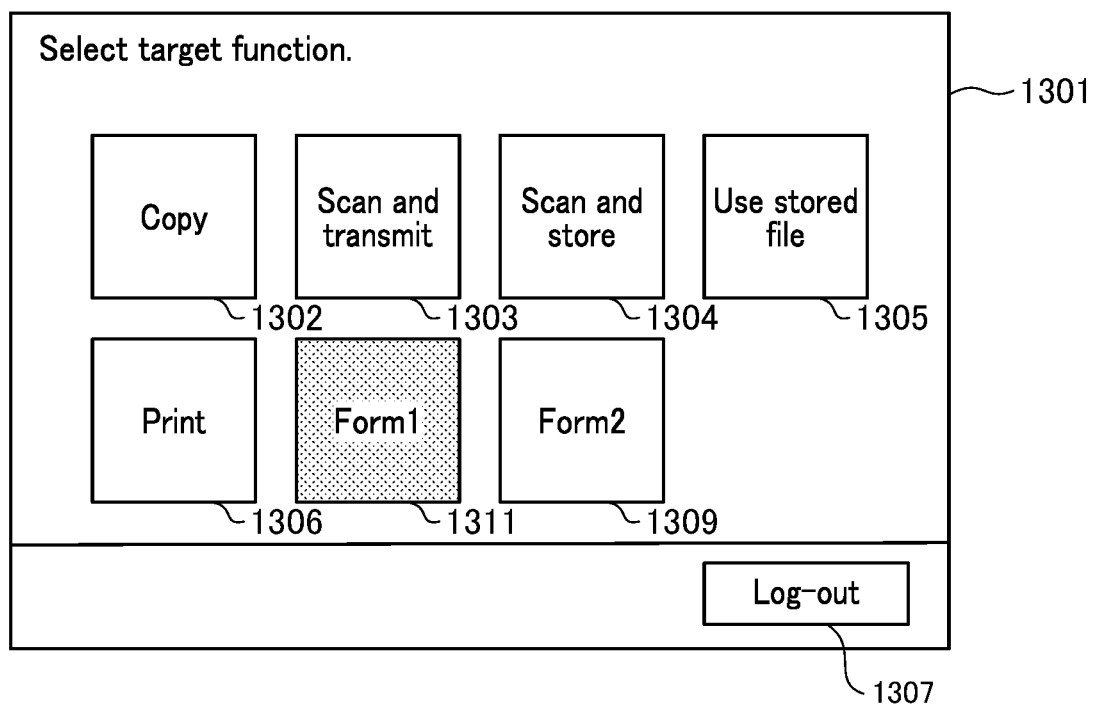
FIG. 14 is a diagram illustrating an example of a home screen.

FIG. 14 is an example of the home screen 1301. Similarly to FIG. 13C, the present screen is an example of a screen when the bibliographic information 1021 of the fixed form document is not within a printable period, but the bibliographic information 1022 of the fixed form document is within the printable period. A Form 1 button 1311 is a fixed form document button and is equivalent to the bibliographic information 1021. The Form 1 button 1311 is displayed on the home screen 1301 in FIG. 14, but a gray-out display is performed, and a user cannot press it. On the other hand, the Form 2 button 1309 is a fixed form document button and is equivalent to the bibliographic information 1022. Since the bibliographic information 1022 of the fixed form document is within the printable period, the Form 2 button 1309 is displayed on the home screen 1301 in FIG. 14, and a user can perform printing.

Meanwhile, in the present disclosure, switching between not displaying a button for giving an instruction for executing the printing of a fixed form document (FIG. 13C) when the fixed form document is not within a printable period and displaying the button in an invalid state (gray-out display in FIG. 14) may also be possible. For example, the UI control unit 302 displays a button (hereinafter, referred to as a "display switching button") for setting whether not to display a button for giving an instruction for executing the printing of a fixed form document when the fixed form document is not within a printable period or to display the button in an invalid state on the registration screen 901. The UI control unit 302 stores the setting of the display switching button as bibliographic information of each fixed form document in the bibliographic information list 1001. The UI control unit 302 reads the setting of the display switching button in the bibliographic information list 1001 at the time of displaying the home screen 1301. The UI control unit 302 performs switching between not displaying a button for giving an instruction for executing the printing of a fixed form document when the fixed form document is not within a printable period and displaying the button in an invalid state, on the basis of the setting of the display switching button in the bibliographic information list 1001. Means for performing settings using the display switching button is an example of a display setting unit.

Figure 15:
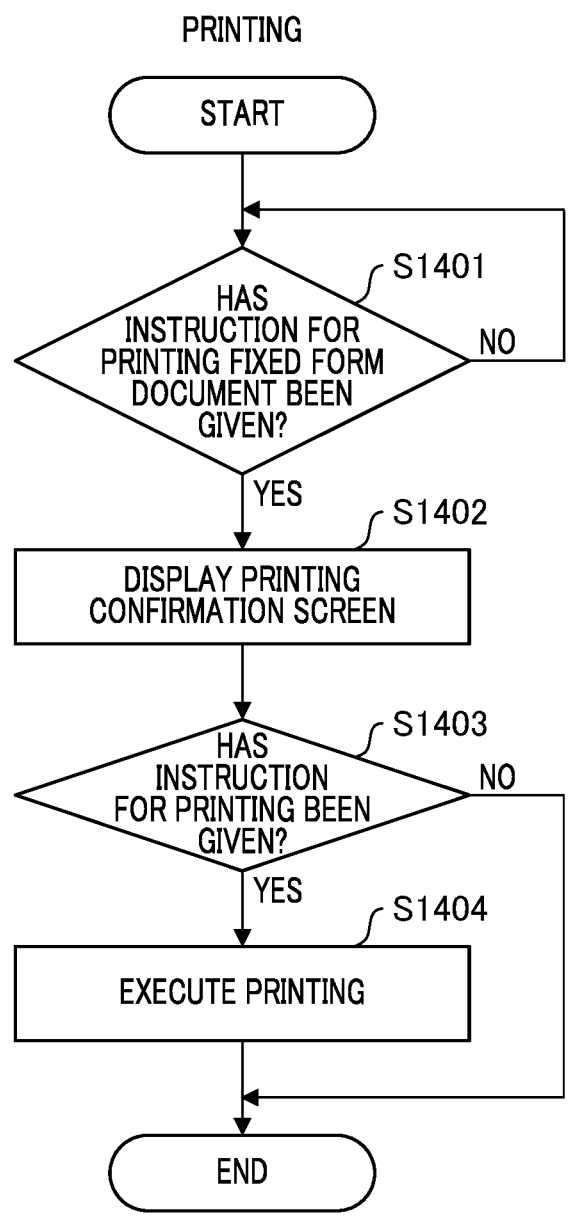
FIG. 15 is a flowchart illustrating printing of a fixed form document.

Next, processing for printing a fixed form document registered in the HDD 205 will be described using FIG. 15. FIG. 15 is a flowchart illustrating the printing of a fixed form document which is executed by the CPU 202 of the image forming apparatus 102.

Figure 16:
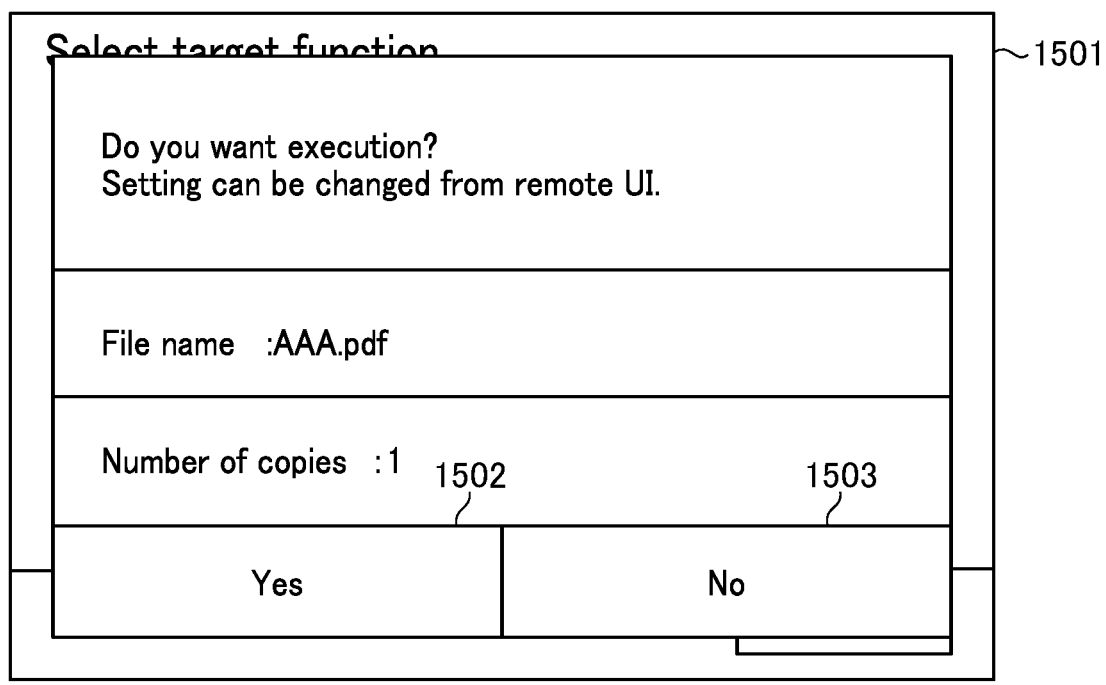
FIG. 16 is a diagram illustrating an example of a printing confirmation screen.

The UI control unit 302 waits until an instruction for printing a fixed form document is given (S1401). For example, if the Form 1 button 1308 which is a fixed form document button on the home screen 1301 in FIG. 13B is pressed, the UI control unit 302 displays the printing confirmation screen 1501 (see FIG. 16) (S1402). FIG. 16 is an example of the printing confirmation screen 1501. The printing confirmation screen 1501 displays a YES button 1502 and a NO button 1503. The image forming apparatus 102 executes printing when the YES button 1502 is pressed, and does not execute printing when the NO button 1503 is pressed.

The UI control unit 302 determines whether or not a printing instruction has been given (S1403). If the printing instruction has been given (the YES button 1502 has been pressed) in S1403, the job management unit 307 transmits the printing instruction to the job control unit 308 (S1404). If the printing instruction has not been given (the NO button 1503 has been pressed) in S1403, the processing ends.

Example 2

Hereinafter, Example 2 of the present disclosure will be described. Differences of the present example from Example 1 are as follows. That is, in Example 2, a button associated with a registered fixed form document is not displayed only within a printable period, and is displayed at all times regardless of whether or not the fixed form document is within the printable period. In addition, when a printing button has been pressed, the fixed form document associated with the button is printed only within the printable period. In this manner, according to Example 2, it is possible to provide the image forming apparatus 102 that can print a fixed form document in a limited time by executing printing only within a printable period. Meanwhile, differences of the present example from Example 1 will be described.

Processing for displaying a fixed form document button for printing a fixed form document registered in the HDD 205 on the operation device 207 will be described using FIG. 17. In the present example, a user operates the image forming apparatus 102 to perform user authentication and logs on the image forming apparatus 102. In addition, an example in which a home screen including a fixed form document button is displayed on the operation device 207 on the basis of the user's login will be described. However, a user authentication method is not limited thereto, and other authentication methods such as IC card authentication may be used.

Figure 17:
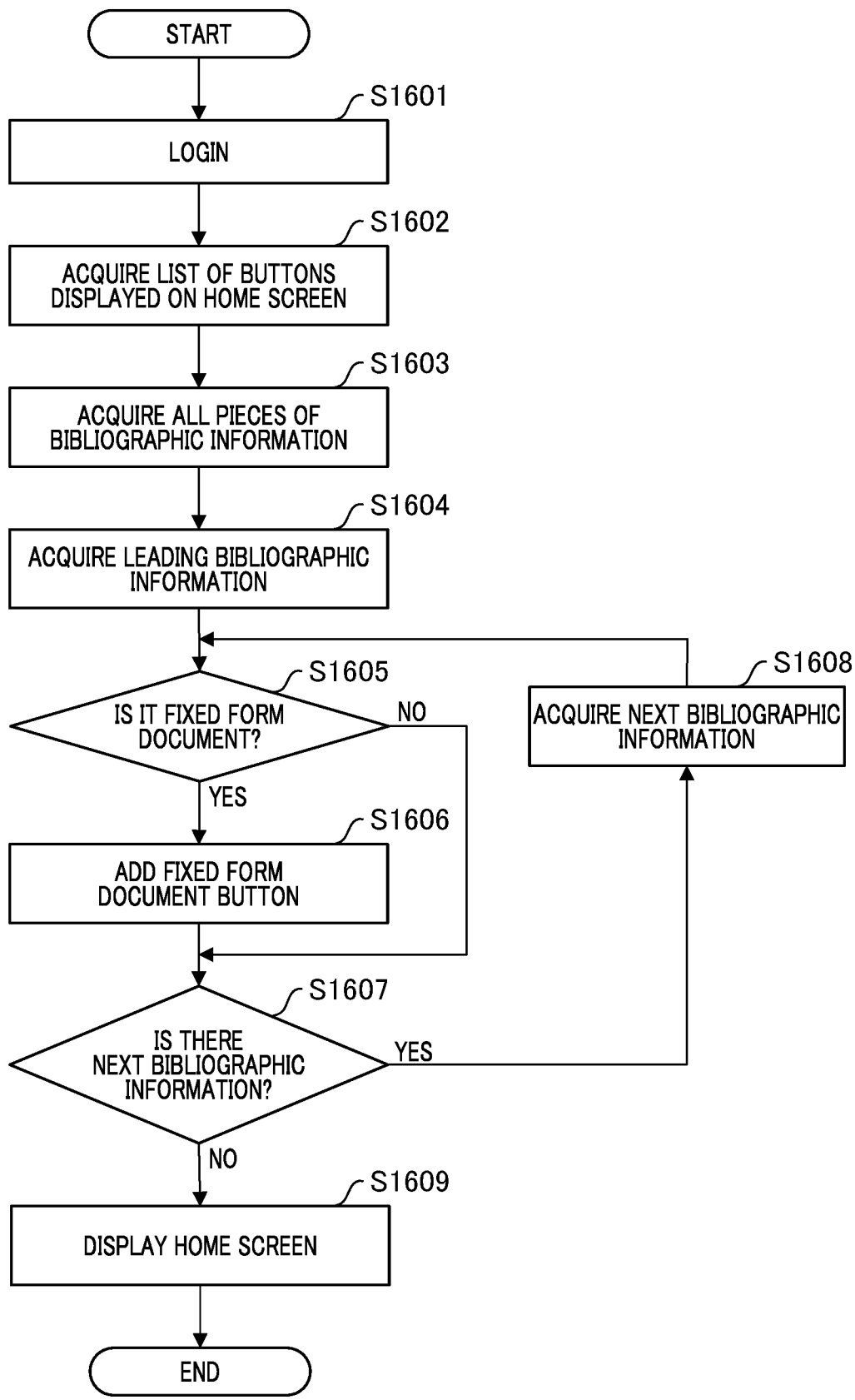
FIG. 17 is a flowchart illustrating processing for displaying a fixed form document button on an operation device.

FIG. 17 is a flowchart illustrating processing for displaying a fixed form document button on an operation device, the processing being executed by the CPU 202 of the image forming apparatus 102. Meanwhile, S1601 to S1605 are the same as S1101 to S1105 in Example 1, and thus detailed description thereof will be omitted.

As a result of the determination in S1605, if the printing job type is not a fixed form document, the UI control unit 302 determines whether or not the bibliographic information list 1001 includes the next bibliographic information (S1607). As a result of the determination in S1605, if the printing job type is a fixed form document, the UI control unit 302 adds a fixed form document button to the button list displayed on home screen (S1606). The processing of the present bibliographic information 1021 ends here, and the UI control unit 302 determines whether or not the bibliographic information list 1001 includes the next bibliographic information (S1607).

As a result of the determination in S1607, if the bibliographic information list 100I includes the next bibliographic information, the UI control unit 302 acquires the next bibliographic information (S1608) and returns to the determination in S1605. As a result of the determination in S1607, if the bibliographic information list 1001 does not include the next bibliographic information, the UI control unit 302 displays a home screen including a list of buttons to be displayed on the home screen on the operation device 207 (S1609). As described above, a fixed form document button is displayed at all times regardless of whether or not a fixed form document is within a printing period. For example, if the bibliographic information 1021 and 1022 of the fixed form document are registered, the home screen illustrated in FIG. 13B is displayed on the operation device 207 regardless of whether or not a fixed form document is within a printing period.

Figure 18:
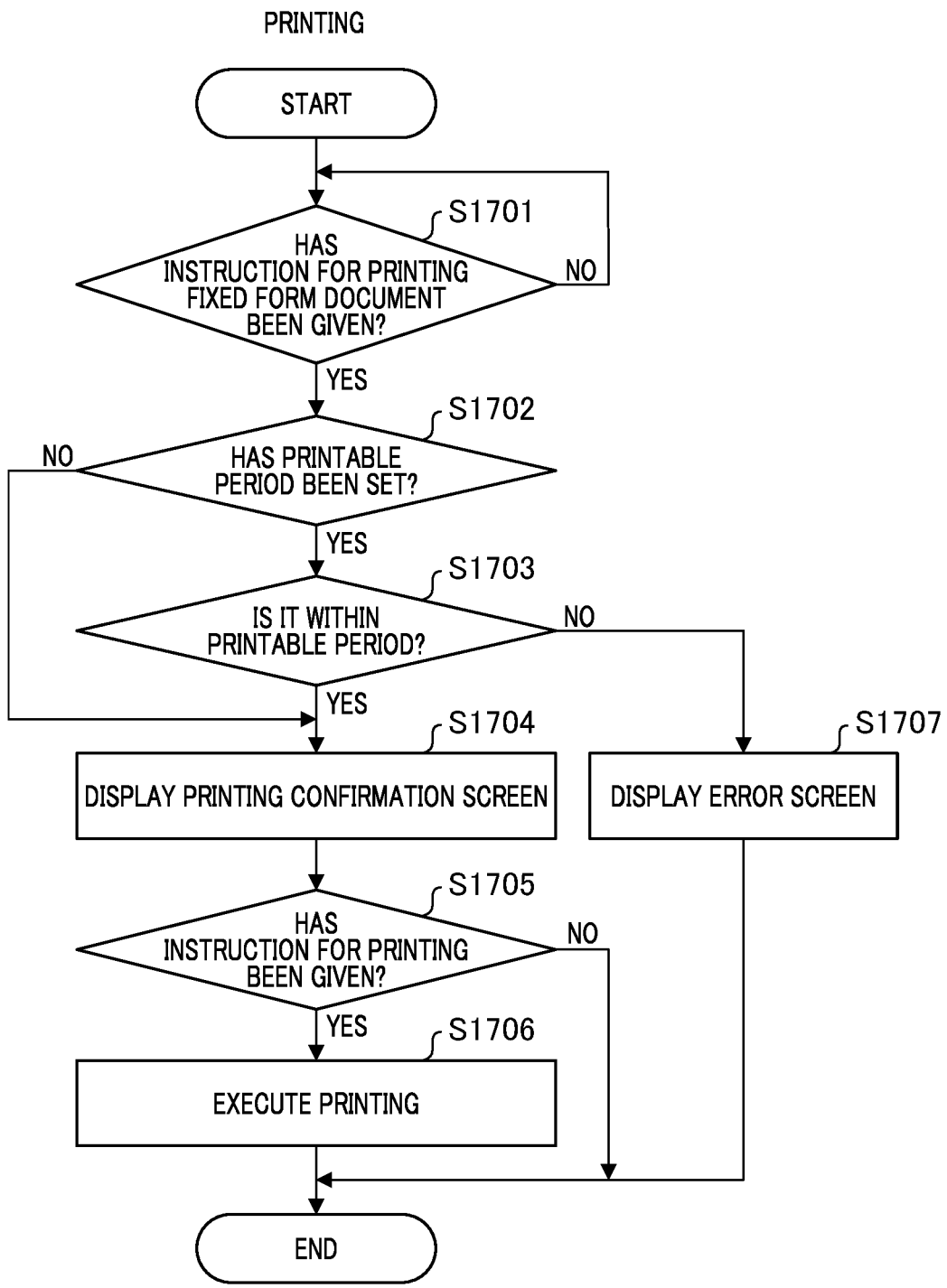
FIG. 18 is a flowchart illustrating printing of a fixed form document.

Next, processing for printing a fixed form document registered in the HDD 205 will be described using FIG. 18. FIG. 18 is a flowchart illustrating the printing of a fixed form document which is executed by the CPU 202 of the image forming apparatus 102.

The UI control unit 302 waits until an instruction for printing a fixed form document is given (S1701). For example, if the Form 1 button 1308 which is a fixed form document button on the home screen 1301 is pressed, the UI control unit 302 determines whether or not a printable period has been set (S1702). This is determined in accordance with whether the starting date and time 1008 has been set, whether the ending date and time 1009 has been set, or whether both of them have been set.

As a result of the determination in S1702, if a printable period has not been set, the UI control unit 302 displays a printing confirmation screen 1501 (S1704). As a result of the determination in S1702, if a printable period has been set, the UI control unit 302 determines whether or not the present date and time is within the printable period (S1703). The UI control unit 302 performs determination by acquiring the present date and time from a system service of the image forming apparatus 102 and comparing the present date and time with the starting date and time 1008 and the ending date and time 1009. Specifically, if the present date and time is prior to the starting date and time 1008 or if the present date and time is later than the ending date and time 1009, the UI control unit 302 determines that the present date and time is not within the printable period. In addition, if the present date and time is between the starting date and time 1008 and the ending date and time 1009 (including the starting date and time 1008 and the ending date and time 1009), the UI control unit 302 determines that the present date and time is within the printable period. For example, if the present date and time is 2020/10/27 12:34:56, the UI control unit 302 determines that the present date and time is not within the printable period for the bibliographic information 1021 of the fixed form document. In addition, if the present date and time is 2020/11/21 12:34:56, the UI control unit 302 determines that the present date and time is not within the printable period for the bibliographic information 1021 of the fixed form document. In addition, if the present date and time is 2020/11/12 12:34:56, the UI control unit 302 determines that the present date and time is within the printable period for the bibliographic information 1021 of the fixed form document.

Figure 19:
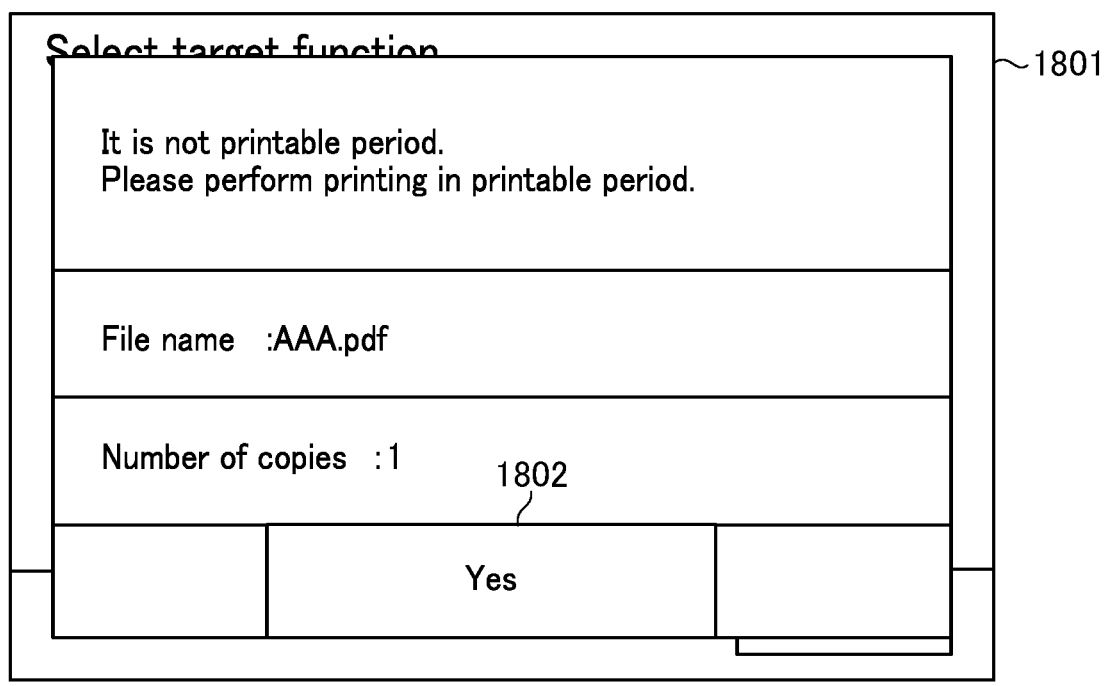
FIG. 19 is a diagram illustrating an example of an error screen.

As a result of the determination in S1703, if it is determined that the present date and time is within the printable period, the UI control unit 302 displays a printing confirmation screen 1501 (S1704). As a result of the determination in S1703, if it is determined that the present date and time is not within the printable period, the UI control unit 302 displays an error screen 1801 (see FIG. 19) and terminates the flow. FIG. 19 is an example of the error screen 1801. The error screen 1801 displays a YES button 1802. When the YES button 1802 is pressed, the error screen 1801 is closed.

The printing confirmation screen 1501 in Example 2 is similar to the printing confirmation screen 1501 in Example 1 illustrated in FIG. 16, and thus detailed description thereof will be omitted. The UI control unit 302 determines whether or not a printing instruction has been given (S1705). If the printing instruction has been given (the YES button 1502 has been pressed) in S1705, the job management unit 307 transmits the printing instruction to the job control unit 308 (S1706). If the printing instruction has not been given (the NO button 1503 has been pressed) in S1705, the processing ends.

Example 3

Hereinafter, Example 3 of the present disclosure will be described. In the present example, an example in which a fixed form document after the date and time of ending of a printable period is deleted from fixed form documents registered in the image forming apparatus 102 will be described.

The image forming apparatus 102 confirms whether or not the date and time of ending of a printable period of a fixed form document registered on a regular basis has elapsed since the image forming apparatus 102 is started. In addition, if the date and time of ending of the printable period has elapsed, the image forming apparatus 102 deletes a fixed form document. In this manner, according to Example 3, when the date and time of ending of the printable period has elapsed, a registered fixed form document is automatically deleted, and thus it is possible to prevent the fixed form document from being forgotten to be deleted. For this reason, it is possible to print a fixed form document in a limited time and provide the image forming apparatus 102 having excellent operability.

Figure 20:
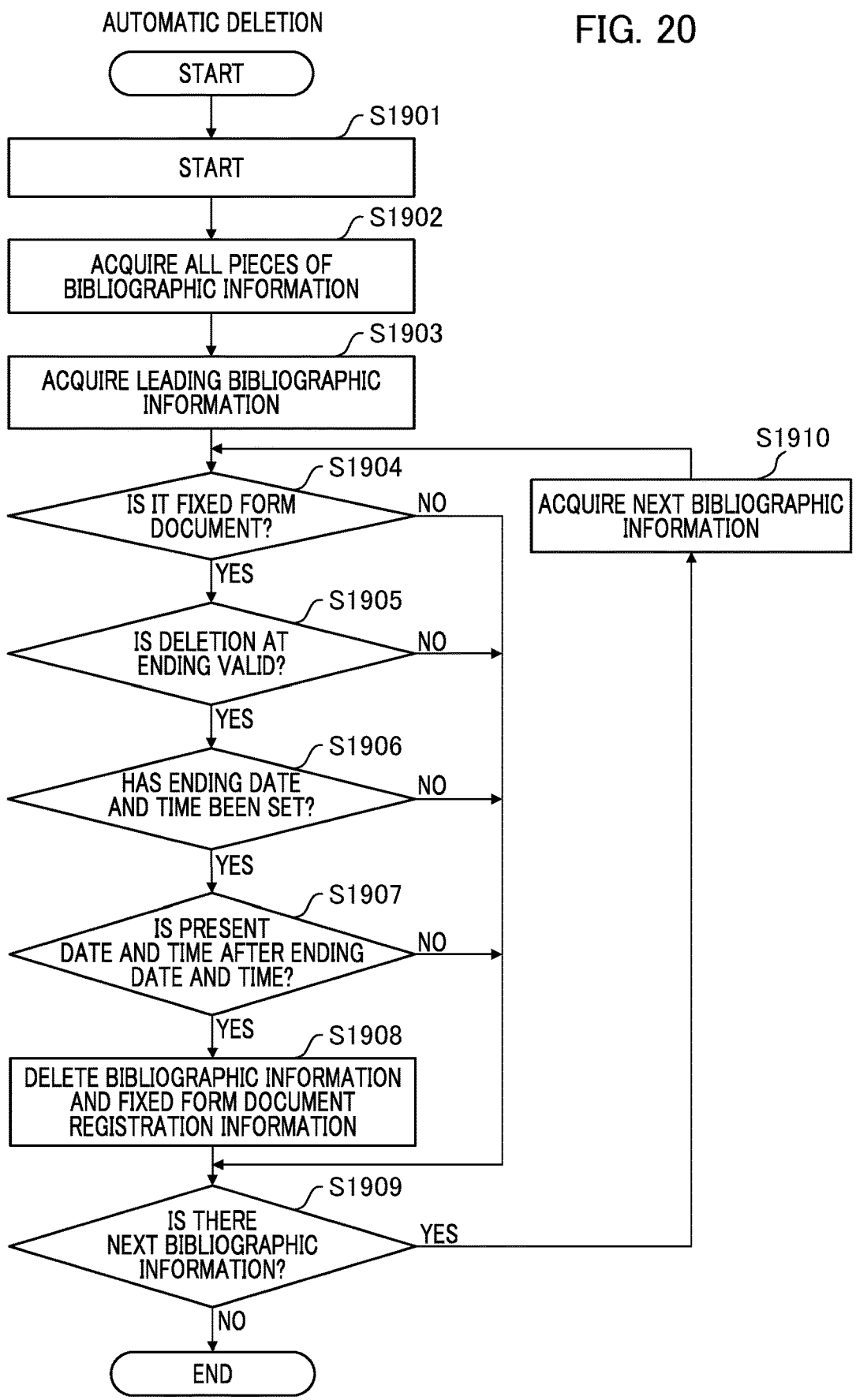
FIG. 20 is a flowchart illustrating processing for automatically deleting a fixed form document from registered fixed form documents after the date and time of ending of a printable period.

Processing for automatically deleting a fixed form document after the date and time of ending of a printable period from fixed form documents registered in the HDD 205 will be described using FIG. 20. FIG. 20 is a flowchart illustrating processing for automatically deleting a fixed form document after the date and time of ending of a printable period from registered fixed form documents, the processing being executed by the CPU 202 of the image forming apparatus 102.

The job management unit 307 receives a notification indicating that the image forming apparatus 102 has been started from the system service of the image forming apparatus 102 (S1901). The job management unit 307 acquires all pieces of bibliographic information 1001 from a storage control unit 305 through a data management unit 304 (S1902).

The job management unit 307 processes and determines all of the pieces of bibliographic information 1001 in order, and thus the job management unit 307 acquires the leading bibliographic information 1021 (S1903). The job management unit 307 determines whether or not the printing job type 1007 of the acquired bibliographic information 1021 is a fixed form document (S1904).

As a result of the determination in S1904, if the printing job type 1007 is not a fixed form document, the job management unit 307 determines whether or not the bibliographic information list 1001 includes the next bibliographic information (S1909). As a result of the determination in S1904, if the printing job type 1007 is a fixed form document, the job management unit 307 determines whether or not the deletion at ending 1010 is set to be YES (S1905).

As a result of the determination in S1905, if the deletion at ending 1010 is NO, the job management unit 307 determines whether or not the bibliographic information list 1001 includes the next bibliographic information (S1909)). As a result of the determination in S1905, if the deletion at ending 1010 is YES, the job management unit 307 determines whether or not the ending date and time 1009 has been set (S1906).

As a result of the determination in S1906, if the ending date and time 1009 has not been set, the job management unit 307 determines whether or not the bibliographic information list 1001 includes the next bibliographic information (S1909). As a result of the determination in S1906, if the ending date and time 100) has been set, the job management unit 307 determines whether or not the present date and time is after the ending date and time 100) (S1907). The UI control unit 302 performs determination by acquiring the present date and time from a system service of the image forming apparatus 102 and comparing the present date and time with the ending date and time 1009. Specifically, if the present date and time is later than the ending date and time 1009, the UI control unit 302 determines that the present date and time is after the ending date and time 1009. For example, if the present date and time is 2020/11/12 12:34:56, the UI control unit 302 determines that the present date and time is not after the ending date and time 1009 for the bibliographic information 1021 of the fixed form document. In addition, if the present date and time is 2020/11/21 12:34:56, the UI control unit 302 determines that the present date and time is after the ending date and time 1009 for the bibliographic information 1021 of the fixed form document.

As a result of the determination in S1907, if it is determined that the present date and time is after the ending date and time 1009, the job management unit 307 deletes bibliographic information and fixed form document registration information from the storage control unit 305 through the data management unit 304 (S1908). As a result of the determination in S1907, if it is determined that the present date and time is not after the ending date and time 1009, the job management unit 307 does not delete the bibliographic information and the fixed form document registration information. The processing of the present bibliographic information 1021 ends here, and the job management unit 307 determines whether or not the bibliographic information list 1001 includes the next bibliographic information (S1909).

As a result of the determination in S190), if the bibliographic information list 1001 includes the next bibliographic information, the job management unit 307 acquires the next bibliographic information (S1910) and returns to the determination in S1904. As a result of the determination in S1909, if the bibliographic information list 1001 does not include the next bibliographic information, the flow ends.

Meanwhile, S1902 to S1910 are executed on a regular basis (for example, at intervals of 10 minutes), and thus a fixed form document that has passed the date and time of ending of a printable period can be automatically deleted.

Meanwhile, in the present example, an example in which it is confirmed on a regular basis whether or not there is a fixed form document having passed the date and time of ending of a printable period has been described. However, the present disclosure is not limited to the method in Example 3 as long as a fixed form document having passed the date and time of ending of a printable period can be automatically deleted. For example, it may be confirmed whether or not there is a fixed form document having passed the date and time of ending of a printable period at a timing when a fixed form document button is displayed on a home screen, and if there is the corresponding fixed form document, deletion processing equivalent to S1908 may be performed. In this manner, it is possible to perform control so that printing cannot be performed when a fixed form document is not within a printable period and to automatically delete a fixed form document having passed the date and time of ending of the printable period.

Example 4

Hereinafter, Example 4 of the present disclosure will be described. In the present example, an example in which a printing job which is input to the image forming apparatus 102 from the PC 101 is retained, and the retained printing job is changed to a fixed form document will be described.

In the present example, a printing job which is input to the image forming apparatus 102 from the PC 101 is not immediately printed and is temporarily retained and stored in a hard disk drive (HDD) 205 or the like included in the image forming apparatus 102. In addition, a printing job retained in the image forming apparatus 102 is registered as a fixed form document by a user operating the operation device 207 of the image forming apparatus 102, or the like. When the fixed form document is registered in the image forming apparatus 102, a printable period of the fixed form document is also registered. A button associated with the registered fixed form document is displayed on the operation device 207 of the image forming apparatus 102. At this time, control is performed so that the button is displayed only in a printable period of the fixed form document. When the button is pressed, the fixed form document associated with the button is printed. In this manner, it is possible to provide the image forming apparatus 102 capable of printing a fixed form document in a limited time by also setting a printable period at the time of registering the fixed form document from a retained printing job.

The image forming apparatus 102 stores a printing job which is input to the image forming apparatus 102 from the PC 101 in the HDD 205. When, for example, a print 1306 on the home screen 1301 is pressed, the image forming apparatus 102 can display information on a printing job stored in the HDD 205 on a printing job list screen 2000 (see FIG. 21A).

FIG. 21A is an example of a printing job list screen. In the present screen, a user can operate a retained printing job.

When the user selects a printing waiting 2001, the job management unit 307 acquires a user name of a logged-in user from the authentication unit 303. In addition, the job management unit 307 acquires bibliographic information corresponding to the logged-in user by retrieving bibliographic information in which the acquired user name is included in the user name 1003 (see FIG. 10B) from the bibliographic information list 1001.

If there is bibliographic information corresponding to the logged-in user, the UI control unit 302 displays the bibliographic information acquired by the job management unit 307 on the operation device 207. For example, if the user name of the logged-in user is User1, the job management unit 307 acquires bibliographic information 1023 to 1025 in FIG. 10B. Meanwhile, the bibliographic information 1021 to 1022 in FIG. 108 are not acquired because the printing job type 1007 is a fixed form document. In addition, the bibliographic information 1026 in FIG. 10B is not acquired because the printing job type 1007 is reserved printing. In addition, the bibliographic information 1027 in FIG. 10B is not acquired because the user name 1003 is User2. The UI control unit 302 displays the pieces of bibliographic information acquired by the job management unit 307 as bibliographic information 2018 to bibliographic information 2020.

When the user selects a printed 2002 in the printing job list screen 2000, the job management unit 307 retrieves a printing job for which printing was executed in the past, and the UT control unit 302 displays the bibliographic information on a screen which is not illustrated in the drawing.

When the user selects a reserved printing 2003 in the printing job list screen 2000, the job management unit 307 retrieves a reserved printing job for which the time of printing has been set from the bibliographic information list 1001. The UI control unit 302 displays bibliographic information of the retrieved reserved printing job on a reserved printing screen which is not illustrated in the drawing.

When the user selects an update 2004 in the printing job list screen 2000, the job management unit 307 retrieves the bibliographic information list 1001, and the UT control unit 302 updates displayed bibliographic information.

The printing job list screen 2000 includes a job name/printing setting 2005. The UI control unit 302 performs a similar display to those of the printing job name 1005 and the printing setting 1006 on the job name/printing setting 2005.

The printing job list screen 2000 includes a date and time 2006. The UI control unit 302 performs a similar display to that of the registration date and time 1002 on the date and time 2006.

The printing job list screen 2000 includes the number of sheets x the number of copies 2007. The UI control unit 302 displays the number of sheets of analyzed printing jobs and performs a similar display to that of the printing setting 1006 on the number of sheets x the number of copies 2007.

The printing job list screen 2000 includes a job type 2008. The UI control unit 302 displays security on the job type 2008 if the printing job type 1007 is a security, and displays encrypted security if the printing job type 1007 is an encrypted security. Meanwhile, the UI control unit 302 may display a normal or the like in the job type 2008 if the printing job type 1007 is a normal job.

The printing job list screen 2000 includes a user name 2009. The UI control unit 302 performs a similar display to that of the user name 1003 on the user name 2009.

The bibliographic information 2018 to the bibliographic information 2020 are bibliographic information of printing jobs.

When the user selects a select all 2010 in the printing job list screen 2000, the UI control unit 302 sets all pieces of bibliographic information to be in a selected state. In the example of FIG. 21A, all pieces of bibliographic information are the bibliographic information 2018 to the bibliographic information 2020.

When the user selects any one of the bibliographic information 2018 to 2020 and then selects a printing setting 2011 in the printing job list screen 2000, the UI control unit 302 displays a screen (not illustrated) for changing the printing setting of a selected printing job.

When the user selects any one of the bibliographic information 2018 to 2020 and then selects an image display 2012 in the printing job list screen 2000, the UI control unit 302 displays a screen (not illustrated) for displaying a preview image of a selected printing job.

When the user selects any one of the bibliographic information 2018 to 2020 and then selects a job deletion 2013 in the printing job list screen 2000, the job management unit 307 deletes a selected printing job.

When the user selects any one of the bibliographic information 2018 to 2020 and then selects a printing stop 2014 in the printing job list screen 2000, the job management unit 307 stops printing processing if a selected printing job is being printed.

When the user selects any one of the bibliographic information 2018 to 2020 and then selects a printing start 2015 in the printing job list screen 2000, the job management unit 307 executes the printing of a selected printing job.

When the user selects any one of the bibliographic information 2018 to 2020 and then selects a change to fixed form document 2016 in the printing job list screen 2000, the job management unit 307 changes a selected printing job to a fixed form document.

When the user selects a log-out 2017 in the printing job list screen 200, the authentication unit 303 performs log-out processing, and the UI control unit 302 displays the user authentication screen 1201 on the operation device 207.

Figure 22:
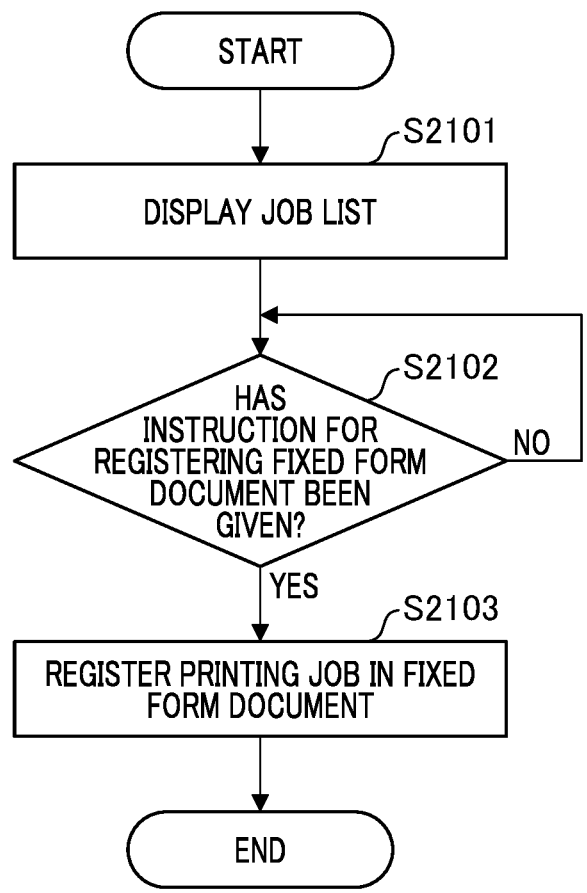
FIG. 22 is a flowchart illustrating the registration of a fixed form document of a printing job.

FIG. 22 is a flowchart illustrating the registration of a fixed form document of a printing job in the system software 301, the registration being executed by the CPU 202 of the image forming apparatus 102.

The UI control unit 302 displays the printing job list screen 2000 (S2101). The UI control unit 302 determines whether or not an instruction for registering a fixed form document has been given (S2102). When the user selects a printing job (for example, the bibliographic information 2018) and selects the change to fixed form document 2016, the UI control unit 302 determines that an instruction for registering a fixed form document has been given.

If an instruction for registering a fixed form document has been given, the job management unit 307 registers a printing job of the selected bibliographic information 2018 in a fixed form document (S2103). When the printing job is registered in the fixed form document, the UI control unit 302 can make the printing job overlap the printing job list screen 2000 as illustrated in FIG. 21B to display a screen 1620 for registering setting information and the setting information can thereby be registered at the same time. If the user has added the setting information in the screen 1620 for registering setting information, the job management unit 307 updates bibliographic information with the added information.

FIG. 21B is an example of a screen for performing a change to a fixed form document. In FIG. 21B, the screen 1620 for registering setting information is displayed on the printing job list screen 2000.

The UI control unit 302 displays a radio button 1621 for selecting the type of fixed form document to be registered on the screen 1620 for registering setting information. When a shared document is selected with the radio button 1621, the job management unit 307 registers the shared document as a document that can be referred to and printed by people other than a registrant of a fixed form document. When a personal document is selected with the radio button 1621, the job management unit 307 registers the personal document as a document that can be referred to and printed only by a registrant of a fixed form document.

A text box 1622 and a text box 1623 for inputting a printable period of a fixed form document to be registered are displayed on the screen 1620 for registering setting information. The text box 1622 is a text box for inputting the date and time when a printable period of a document to be registered starts. The text box 1623 is a text box for inputting the date and time when a printable period of a document to be registered ends. The text box 1622 and the text box 1623 are text boxes for inputting the year, month, day, hour, and minute of the date and time of starting of a printable period and the date and time of ending of the printable period.

A method of designating a printable period with the text box 1622 and the text box 1623 is an example of a method of designating a printable period. In the present disclosure, a printable period may be designated by other methods. For example, the UI control unit 302 may display a text box for inputting only the starting date and the ending date of a printable period. In addition, the UI control unit 302 may display hours, minutes, and seconds as the date and time of starting of a printable period and the date and time of ending of the printable period. In addition, the UI control unit 302 may display only the date and time of starting or only the date and time of ending.

In addition, a check box 1624 for automatically deleting a document to be registered when the date and time of ending of a printable period of the document to be registered has elapsed is displayed on the screen 1620 for registering setting information. In general, it is necessary to press the deletion button 808 in order to delete a fixed form document. However, when the check box 1624 is checked, it is possible to automatically delete a registered fixed form document if the date and time of ending which is set with the text box 1623 has elapsed. That is, the check box 1624 may be checked for the purpose of using a fixed form document in a limited time. On the other hand, if the fixed form document is used on a regular basis (for example, from the 1st to the 3rd of every month or from the 2nd to the 20th of November every year) even for the purpose of using the fixed form document in a limited time, the check box 1624 should not be checked. In this case, it is preferable to make it possible to set a regular printable period on a screen on which a regular printable period can be set which is not illustrated here. When a registration button 1625 is pressed, a selected printing job 2018 is registered in a fixed form document.

In addition, a cancellation button 2019 is displayed on the screen 1620 for registering setting information. When the cancellation button 2019 is pressed, the job management unit 307 does not register a printing job of selected bibliographic information 2018 in a fixed form document, and the UI control unit 302 closes the screen 1620 for registering setting information.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-014451, filed Feb. 1, 2021 which is hereby incorporated by reference herein in its entirety.

What is claimed is:

1. An image forming apparatus comprising:
an operation device;
one or more memories; and
one or more processors that execute instructions to:
receive an instruction for registering a document in the one or more memories,
register the document according to the instruction in the one or more memories, and
control the operation device such that a function selection screen including a button for instructing execution of printing of the registered document is displayed,
wherein if the instruction received by a reception unit includes information indicating a printing valid period of the document according to the instruction, a button for instructing execution of printing of the document according to the instruction is selectably displayed on the function selection screen even if a current date and time are outside the printing valid period, and
wherein if the button is selected and a date and time when the button was selected is outside the printing valid period, a notification that the button should be selected during the printing valid period is made.

2. The image forming apparatus according to claim 1, wherein the printing valid period of the document according to the instruction includes a plurality of printing valid periods that arrive on a regular basis.

3. The image forming apparatus according to claim 1, wherein the one or more processors further execute the instructions to set whether or not to delete the document from the one or more memories when the printing valid period of the document according to the instruction has ended.

4. The image forming apparatus according to claim 1, wherein the one or more processors further execute the instructions to set whether or not to display the button for instructing execution of printing of the document or to display the button in an invalid state, in a period other than the printing valid period of the document according to the instruction.

5. A control method for an image forming apparatus that includes an operation device and one or more memories, the control method comprising:
receiving an instruction for registering a document in the one or more memories;
registering the document according to the instruction in the one or more memories;
controlling the operation device so that a function selection screen including a button for instructing execution of printing of the registered document is displayed,
wherein if the received instruction includes information indicating a printing valid period of the document according to the instruction, a button for instructing execution of printing of the document according to the instruction is selectably displayed as on the function selection screen even if a current date and time are outside the printing valid period, and
wherein if the button is selected and a date and time when the button was selected is outside the printing valid period, a notification that the button should be selected during the printing valid period is made.

6. A non-transitory computer readable storage medium storing a computer program for making a computer execute a control method for an image forming apparatus that includes an operation device and one or more memories, the control method comprising:
receiving an instruction for registering a document in the one or more memories;
registering the document according to the instruction in the one or more memories;
controlling the operation device so that a function selection screen including a button for instructing execution of printing of the registered document is displayed,
wherein if the received instruction includes information indicating a printing valid period of the document according to the instruction, a button for instructing execution of printing of the document according to the instruction is selectably displayed on the function selection screen even if a current date and time are outside the printing valid period, and
wherein if the button is selected and a date and time when the button was selected is outside the printing valid period, a notification that the button should be selected during the printing valid period is made.

* * * * *